US011719304B2

(12) United States Patent
Montagna et al.

(10) Patent No.: US 11,719,304 B2
(45) Date of Patent: Aug. 8, 2023

(54) DAMPER ASSEMBLY

(71) Applicant: DRiV Automotive Inc., Lake Forest, IL (US)

(72) Inventors: Franky Montagna, Bilzen (BE); Ronny Vanbrabant, Heusden-Zolder (BE); Rahul Popatrao Ekatpure, Sint-Truiden (BE)

(73) Assignee: DRiV Automotive Inc., Southfield, MI (US)

(*) Notice: Subject to any disclaimer, the term of this patent is extended or adjusted under 35 U.S.C. 154(b) by 105 days.

(21) Appl. No.: 17/214,265

(22) Filed: Mar. 26, 2021

(65) Prior Publication Data

US 2021/0301897 A1  Sep. 30, 2021

Related U.S. Application Data

(60) Provisional application No. 63/090,510, filed on Oct. 12, 2020, provisional application No. 63/090,475, (Continued)

(51) Int. Cl.
*F16F 9/32* (2006.01)
*F16F 9/34* (2006.01)
(Continued)

(52) U.S. Cl.
CPC .............. *F16F 9/3235* (2013.01); *F16F 9/19* (2013.01); *F16F 9/3484* (2013.01); (Continued)

(58) Field of Classification Search
CPC .......... F16F 9/19; F16F 9/3235; F16F 9/3484; F16F 9/3488; F16F 9/50; F16F 2222/12; (Continued)

(56) References Cited

U.S. PATENT DOCUMENTS

| 4,484,669 A | 11/1984 | Kato | |
|---|---|---|---|
| 5,226,512 A * | 7/1993 | Kanari | F16F 9/512 |
| | | | 188/322.22 |

(Continued)

FOREIGN PATENT DOCUMENTS

| DE | 3445684 A1 | 6/1986 |
|---|---|---|
| DE | 102013223221 B3 | 3/2015 |

(Continued)

OTHER PUBLICATIONS

Notification of Transmittal of International Search Report and Written Opinion of International Searching Authority for International Application No. PCT/US2021/024455 dated Jul. 13, 2021 (13 pages).

(Continued)

*Primary Examiner* — Thomas J Williams
*Assistant Examiner* — James K Hsiao
(74) *Attorney, Agent, or Firm* — DRiV Automotive Inc.

(57) ABSTRACT

A damper assembly includes a cylinder defining a chamber. The damper assembly includes a body supported by the cylinder and having a first surface and a second surface opposite the first surface. The body defines a passage extending from the first surface to the second surface. One of the first surface or the second surface define a slope at the passage. The damper assembly includes a check disc at the slope, the check disc selectively restricting fluid flow through the passage.

20 Claims, 29 Drawing Sheets

Related U.S. Application Data filed on Oct. 12, 2020, provisional application No. 63/001,013, filed on Mar. 27, 2020.

(51) Int. Cl.

| | |
|---|---|
| *F16F 9/50* | (2006.01) |
| *F16F 9/19* | (2006.01) |
| *F16F 9/348* | (2006.01) |
| *B60G 13/08* | (2006.01) |
| *B60G 17/08* | (2006.01) |

(52) U.S. Cl.
CPC .............. *F16F 9/3488* (2013.01); *F16F 9/50* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/112* (2013.01); *B60G 2800/162* (2013.01); *F16F 2222/12* (2013.01); *F16F 2228/066* (2013.01); *F16F 2230/183* (2013.01); *F16F 2232/08* (2013.01); *F16F 2234/02* (2013.01)

(58) Field of Classification Search
CPC ........... F16F 2228/066; F16F 2230/183; F16F 2232/08; F16F 2234/02; B60G 17/08; B60G 13/08; B60G 2202/24; B60G 2204/62; B60G 2206/41; B60G 2500/112; B60G 2800/162

See application file for complete search history.

(56) References Cited

U.S. PATENT DOCUMENTS

| | | | | |
|---|---|---|---|---|
| 5,316,113 | A | | 5/1994 | Yamaoka |
| 5,332,069 | A | * | 7/1994 | Murakami ............ F16F 9/3484 188/317 |
| 5,413,195 | A | | 5/1995 | Murakami |
| 7,040,462 | B2 | | 5/2006 | Shinata |
| 7,322,449 | B2 | | 1/2008 | Yamaguchi |
| 7,694,786 | B2 | * | 4/2010 | Asadi ................... F16F 9/3484 188/322.15 |
| 8,042,661 | B2 | * | 10/2011 | Ota ....................... F16F 9/3485 188/282.5 |
| 9,182,005 | B2 | * | 11/2015 | Goldasz ................ F16F 9/3484 |
| 9,249,854 | B2 | * | 2/2016 | Kim ...................... F16F 9/3485 |
| 9,347,512 | B2 | | 5/2016 | Yamada |
| 9,410,595 | B2 | * | 8/2016 | Yamada ................ F16F 9/3481 |
| 9,441,699 | B2 | * | 9/2016 | Lawler .................. F16F 9/3484 |
| 9,500,251 | B2 | * | 11/2016 | Rummel ................ F16F 9/18 |
| 9,777,790 | B2 | * | 10/2017 | Mizuno ................. F16F 9/3485 |
| 9,845,839 | B2 | * | 12/2017 | Rummel .................. F16F 9/18 |
| 10,258,146 | B2 | * | 4/2019 | Hansen .................... A47B 9/10 |
| 10,544,852 | B2 | * | 1/2020 | Inagaki ................... F16F 9/446 |
| 10,995,813 | B2 | * | 5/2021 | Yamashita ................ F16F 9/32 |
| 2005/0056505 | A1 | | 3/2005 | Deferme |
| 2005/0056506 | A1 | * | 3/2005 | Deferme ............... F16F 9/5126 188/322.15 |
| 2005/0279597 | A1 | * | 12/2005 | Yamaguchi ............ F16F 9/348 188/322.13 |
| 2006/0283676 | A1 | | 12/2006 | Deferme |
| 2007/0034466 | A1 | | 2/2007 | Paesmans et al. |
| 2012/0312649 | A1 | | 12/2012 | Robertson |
| 2013/0234378 | A1 | * | 9/2013 | Ericksen ................ B60G 13/06 267/221 |
| 2014/0048366 | A1 | * | 2/2014 | Lee ....................... F16F 9/5126 188/322.15 |
| 2014/0231199 | A1 | | 8/2014 | Kim et al. |
| 2014/0262655 | A1 | * | 9/2014 | Tuts ......................... F16F 9/512 188/322.15 |
| 2014/0332332 | A1 | * | 11/2014 | Lawler .................. F16F 9/3484 188/313 |
| 2015/0041269 | A1 | * | 2/2015 | Lim ...................... F16F 9/5126 188/322.15 |
| 2015/0114774 | A1 | | 4/2015 | Kim |
| 2015/0337918 | A1 | * | 11/2015 | Rummel ................ B60G 13/08 188/315 |
| 2016/0146286 | A1 | * | 5/2016 | Rummel ................ F16F 9/3484 188/313 |
| 2016/0201752 | A1 | * | 7/2016 | Kim ...................... F16F 9/3415 188/280 |
| 2016/0243917 | A1 | | 8/2016 | Ankney |
| 2016/0258504 | A1 | * | 9/2016 | Mizuno ................. F16F 9/3484 |
| 2016/0356335 | A1 | * | 12/2016 | Nomura .................... F16F 9/19 |
| 2017/0241502 | A1 | * | 8/2017 | Rummel ................. F16F 9/348 |
| 2018/0355945 | A1 | * | 12/2018 | De Kock .............. F16F 9/5126 |
| 2019/0226546 | A1 | * | 7/2019 | Förster ................. F16F 9/3488 |
| 2019/0271373 | A1 | * | 9/2019 | Cox ....................... F16F 9/3488 |
| 2019/0285130 | A1 | * | 9/2019 | Rosseler ............... F16F 9/3485 |
| 2019/0331193 | A1 | * | 10/2019 | Förster ................. F16F 9/3488 |
| 2022/0196106 | A1 | | 6/2022 | Wimmer |

FOREIGN PATENT DOCUMENTS

| | | |
|---|---|---|
| DE | 102014008993 A1 | 4/2015 |
| DE | 102017207605 A1 | 11/2018 |
| DE | 112017006013 T5 | 9/2019 |
| DE | 112017007198 T5 | 11/2019 |
| EP | 2141382 A1 | 1/2010 |
| EP | 2980442 A1 | 2/2016 |
| ES | 2166315 A1 | 4/2002 |
| KR | 100443884 B1 | 8/2004 |
| WO | 2019069413 A1 | 4/2019 |
| WO | 2019163579 A1 | 8/2019 |

OTHER PUBLICATIONS

Notification of Transmittal of International Search Report and Written Opinion of International Searching Authority for International Application No. PCT/US2021/024430 dated Jul. 13, 2021 (11 pages).

Notification of Transmittal of International Search Report and Written Opinion of International Searching Authority for International Application No. PCT/US2021/024469 dated Jul. 9, 2021 (11 pages).

Non-Final Office Action dated Sep. 1, 2022 issued for U.S. Appl. No. 17/214,218 (34 pages).

\* cited by examiner

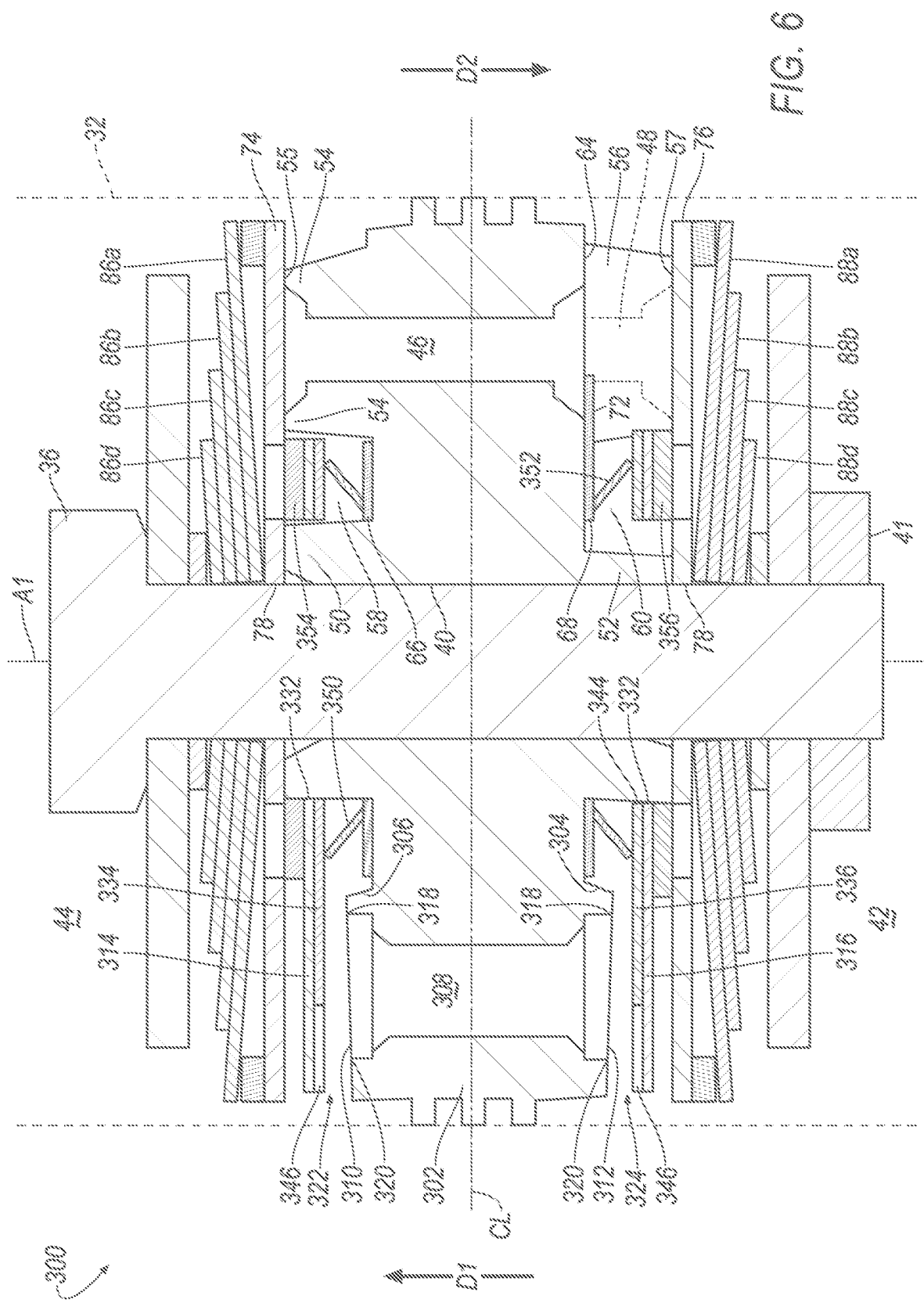

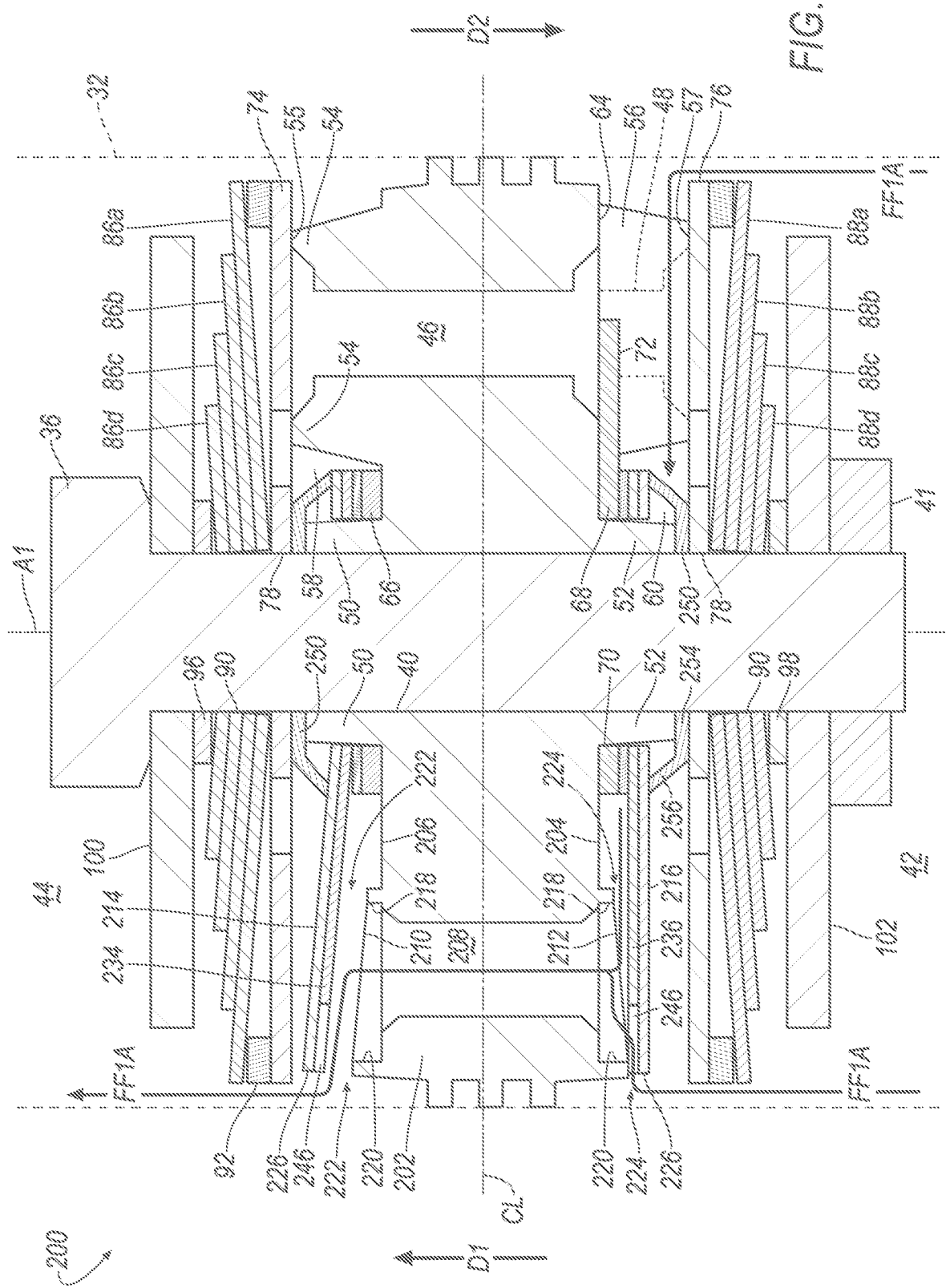

DAMPER ASSEMBLY

CROSS-REFERENCE TO RELATED APPLICATIONS

The subject patent application claims priority to and all the benefits of U.S. Provisional Patent Application 63/001,013 filed on Mar. 27, 2020, U.S. Provisional Patent Application 63/090,475 filed on Oct. 12, 2020, and U.S. Provisional Patent Application 63/090,510 filed on Oct. 12, 2020, all three of which are herein incorporated by reference in their entirety.

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

The dampers control movement of the wheels by limiting fluid flow past a piston of the damper. The fluid flows past the piston, e.g., via passages of the piston when the damper is moved toward a compressed or extended position. The passages may have a fixed opening size. Resistance to movement is provided by the passages limiting an amount of fluid that flows therethrough. The resistance to movement may increase exponentially as movement speed is increased.

Discs may be used to control flow of fluid though the passages, e.g., by flexing or translating to increase or decrease a size of an opening at one end of the passage. Changing the opening size may change force response characteristics of the damper assembly. For example, increasing the opening size may decrease resistance to movement and decreasing the opening size may increase resistance to movement.

It is desired to have further tunability to control the force response of the damper, and to have reduced manufacturing costs and packaging size.

SUMMARY

A damper assembly provides variable and tunable resistance and may be configured to provide a desired a responsive force that is resistant to movement of the damper assembly depending on a speed and direction of the movement, e.g., toward an extended or compressed position. The damper assembly includes a check disc at a slope of a surface of a body that defines one or more passages. The check disc at the slope regulates fluid flow through the one or more passages of the body and controls a rate of change of response force provided by the damper assembly, e.g., controlling an acceleration and/or jerk of the movement of the damper assembly. Other discs may be supported by the body to regulate fluid flow through the one or more passages of the body.

The damper assembly includes the cylinder defining the working chamber. The damper assembly includes the body supported by the cylinder and having a first surface and a second surface opposite the first surface. The body defines a passage extending from the first surface to the second surface. One of the first surface or the second surface define a slope at the passage. The damper assembly includes a check disc at the slope, the check disc selectively restricting fluid flow through the passage.

The damper assembly may include an orifice disc between the check disc and the body.

The orifice disc may abut the body and the check disc.

The orifice disc may define an orifice between the check disc and the body, the orifice open in a radial direction.

The slope may be convex.

The check disc may be movable between a first position toward an outer edge of the passage to a second position.

The slope may be concave.

The check disc may be movable between a first position toward an inner edge of the passage to a second position.

The check disc may selectively restrict fluid flow in a first direction, and the damper assembly may include a second check disc selectively restricting fluid flow through the passage in a second direction opposite first direction.

The body may define a second passage extending from the first surface to the second surface, and the damper assembly may include a blow off disc selectively permitting fluid flow out of the second passage.

The check disc may be between the body and the blow off disc.

The blow off disc may define an opening and a center opening.

The damper assembly may include a spacer disc covering the opening of the blow off disc.

The damper assembly may include a restriction disc covering a portion of the second passage.

The damper assembly may include a spring disc urging the blow off disc toward body.

The damper assembly may include a ring between the spring disc and the blow off disc.

The damper assembly may include a plurality of spring discs urging the blow off disc toward the body, the springs discs progressively decreasing in size.

The damper assembly may include a spring urging the check disc toward the body.

The spring may include a base and a plurality of arms extending circumferentially and axially from the base.

The arms may abut the check disc.

In the present disclosure, and as further described herein, the body defining one or more passages is provided by the exemplary piston described herein. The piston defines one or more passages. Movement of the piston within a working chamber of a pressure tube causes fluid to flow between a compression sub-chamber and a rebound sub-chamber that are on opposite sides of the piston. Such fluid movement may flex discs, e.g., check discs, blow off discs, spring discs, etc., attached to the piston. Flex of the discs attached to the piston controls an opening size of the passages of the piston, regulating fluid flow therethrough and providing variable and tunable resistance to the damper assembly. As an alternative to the piston, the body may be a base attached to an end of the pressure tube of the damper assembly, the base defining one or more passages. The passages defined by the base may provide fluid flow between the working chamber of the pressure tube and a reservoir chamber outside the pressure tube. The base may include the surfaces, features, passages, etc., as described for the piston herein. The various discs described herein may be attached to the base, e.g., as described for the discs attached to the piston, including their orientation, relative positions, etc. The base and the various discs may collectively provide a base valve (or compression valve) assembly that regulates fluid flow between the working chamber and the reservoir chamber. Movement of the piston within the working chamber of the pressure tube may cause fluid to flow between the working chamber and the reservoir chamber via the passages of the base and may flex the discs attached to the base. Flex of the discs attached to the base controls an opening size of the passages of the base, regulating fluid flow therethrough and providing variable and tunable resistance to the damper assembly.

BRIEF DESCRIPTION OF THE DRAWINGS

FIG. 6 is a cross-section of a portion of the damper assembly taken along line 6-6 of FIG. 5B.

FIG. 7 is the cross section of FIG. 4 and illustrating a first fluid flow path when the damper assembly of FIGS. 3A-4 is moved toward a compressed position.

DETAILED DESCRIPTION

Figure 1:
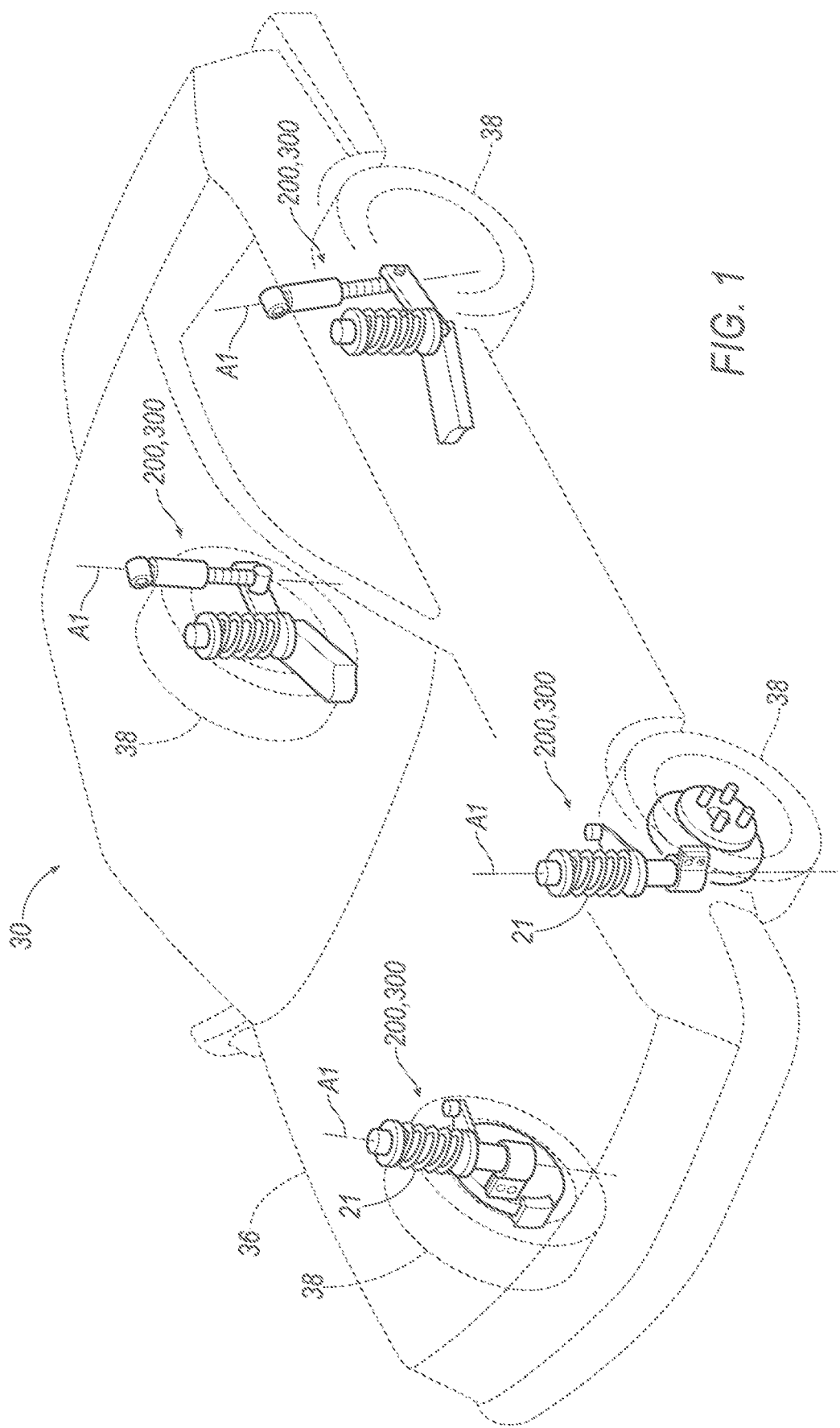
FIG. 1 is a perspective view of a vehicle having a plurality of damper assemblies.

With reference to FIGS. 1-6, and wherein like numerals indicate like parts throughout the several views, a damper assembly 200, 300 for a vehicle 30 includes a cylinder 32 defining a working chamber 34. The damper assembly 200, 300 includes a piston 202, 302 axially slidable within the working chamber 34, the piston 202, 302 having a first surface 204, 304 and a second surface 206, 306 opposite the first surface 204, 304, the piston 202, 302 defining a passage 208, 308 extending from the first surface 204, 304 to the second surface 206, 306, one of the first surface 204, 304 or the second surface 206, 306 defining a slope 210, 212, 310, 312 at the passage 208, 308. The damper assembly 200, 300 includes a check disc 214, 216, 314, 316 at the slope 210, 212, 310, 312 and selectively restricting fluid flow through the passage 208, 308.

The vehicle 30, illustrated in FIG. 1, may be any type of passenger or commercial vehicle 30 such as a car, a truck, a sport utility vehicle, a crossover vehicle, a van, a minivan, a taxi, a bus, etc. The vehicle 30 includes a body 36 and a frame. The body 36 and frame may be of a unibody construction. In the unibody construction, the body 36, e.g., rockers, serves as the vehicle frame, and the body 36 (including the rockers, pillars, roof rails, etc.) is unitary, i.e., a continuous one-piece unit. As another example, the body 36 and frame may have a body-on-frame construction (also referred to as a cab-on-frame construction). In other words, the body 36 and frame are separate components, i.e., are modular, and the body 36 is supported on and affixed to the frame. Alternatively, the body 36 and frame may have any suitable construction. The body 36 and/or the frame may be formed of any suitable material, for example, steel, aluminum, etc.

Figure 2:
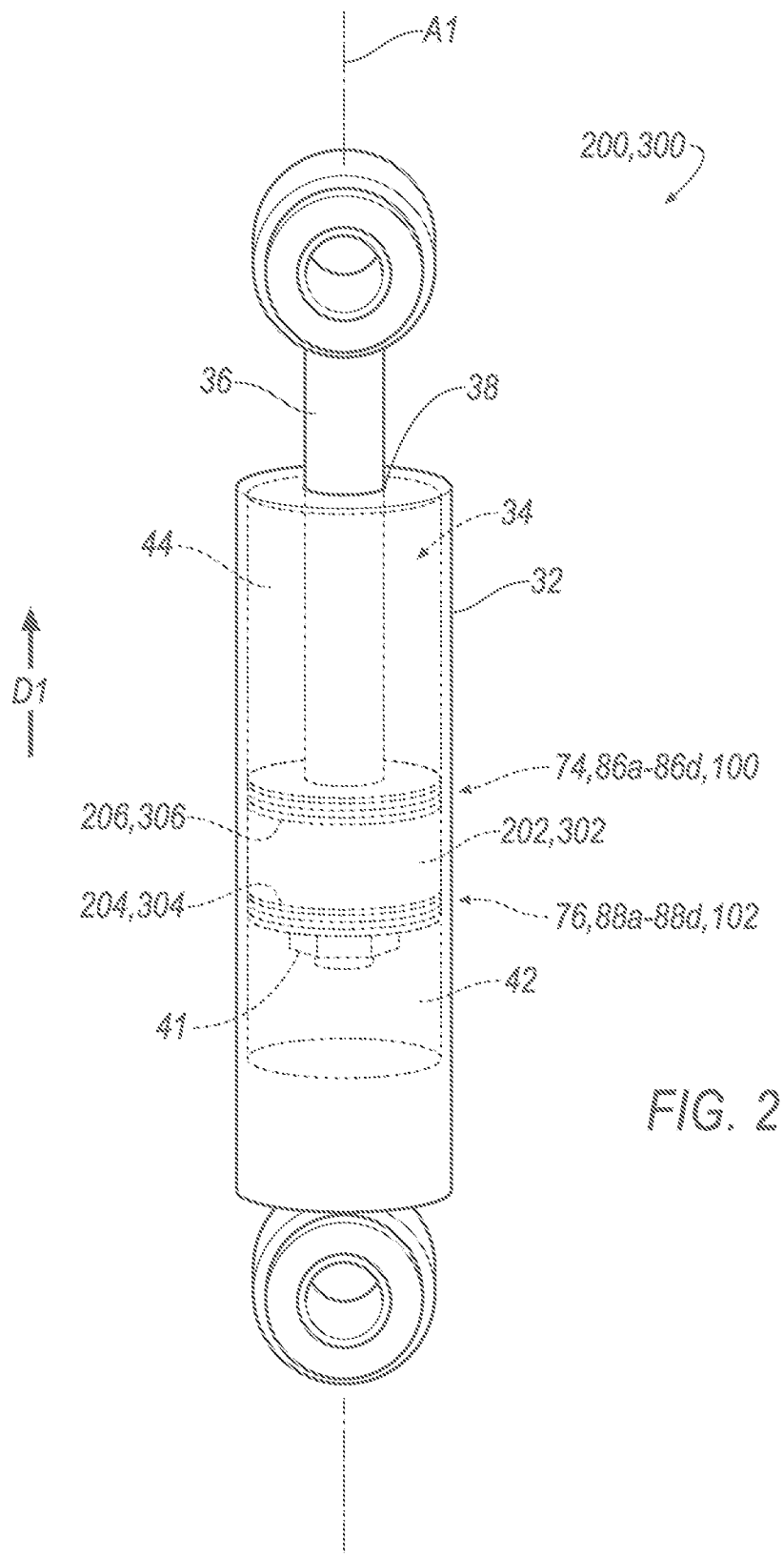
FIG. 2 is a perspective view of one of the damper assemblies.

With reference to FIGS. 1 and 2, the damper assembly 200, 300 controls motion of wheels 38 of the vehicle 30 relative to the body 36 of the vehicle 30. The damper assembly 200, 300 provides variable force to resist motion of the wheels 38 relative to the body 36 based on a speed and direction of such motion.

The damper assembly 200, 300 defines an axis A1 extending between ends of the damper assembly 200, 300. The damper assembly 200, 300 may be elongated along the axis A1. The terms "axially," "radially," and "circumferentially" used herein are relative to the axis A1 defined by the damper assembly 200, 300.

The damper assembly 200, 300 is movable from a compressed position to an extended position, and vice versa. A distance between the ends of the damper assembly 200, 300 is less in the compressed position than in the extended position. Springs or the like may urge the damper assembly 200, 300 toward the extended position. Force applied to wheels 38 of the vehicle 30, e.g., from bumps, potholes, etc., may urge to damper assembly 200, 300 toward the compressed position.

The damper assembly 200, 300 provides resistance to motion, i.e., resistance to moving toward the compressed position or the extended position, that is variable as a function of a speed of such motion. For example, and with reference to FIGS. 9, 12, 15, and 18, curves C1 and C2 illustrate a functional relationship between a velocity (i.e., direction and speed) of movement of the damper assembly 200, 300 and a resistance to such movement.

With reference to FIGS. 2-6, the damper assembly 200, 300 includes the cylinder 32 that defines the working chamber 34. The cylinder 32 may be elongated along the axis A1 of the damper assembly 200, 300, i.e., the cylinder 32 may be hollow and tubular. The cylinder 32 may be metal, or any suitable material. The working chamber 34 is filled with a fluid, e.g., an incompressible hydraulic fluid.

The damper assembly 200, 300 includes a rod 36 extending away from, and movable relative to, the cylinder 32. The rod 36 may be elongated along the axis A1 of the damper assembly 200, 300. The rod 36 is moved relative to the cylinder 32 when the damper assembly 200, 300 is moved toward the compressed position or the extended position.

The rod 36 extends out of the working chamber 34 of the cylinder 32. For example, the cylinder 32 may define an opening 38 at an end of the cylinder 32, and the rod 36 may extend from within the working chamber 34 to outside the working chamber 34 through the opening 38 at the end.

The piston 202, 302 is slidable within the working chamber 34 along the axis A1. The piston 202, 302 is supported by the rod 36, i.e., such that the piston 202, 302 and rod 36 move relative to the cylinder 32 generally in unison. For example, the piston 202, 302 may include a center opening 40. The rod 36 may be in the center opening 40. The piston 202, 302 may be fixed to the rod 36, e.g., via a fastener 41, weld, friction fit, etc. The piston 202, 302 may be metal, plastic, or any suitable material.

The piston 202, 302 divides the working chamber 34 into a compression sub-chamber 42 on one side of the piston 202, 302 and a rebound sub-chamber 44 on an opposite side of the piston 202, 302. Movement of the piston 202, 302 within the working chamber 34 varies volumes of the compression sub-chamber 42 and the rebound sub-chamber 44. For example, movement of the piston 202, 302 when the damper assembly 200, 300 is moved toward the compressed position decreases a volume of the compression sub-chamber 42 and increases a volume of the rebound sub-chamber 44. As another example, movement of the piston 202, 302 when the damper assembly 200, 300 is moved toward the extended position increases the volume of the compression sub-chamber 42 and decreases the volume of the rebound sub-chamber 44. Varying the volumes of the compression sub-chamber 42 and the rebound sub-chamber 44 generates a pressure differential therebetween and may cause fluid within the working chamber 34 to flow from one side of the piston 202, 302 to the opposite side of the piston 202, 302, i.e., from the compression sub-chamber 42 to the rebound sub-chamber 44, or vice versa. The fluid may flow from one side of the piston 202, 302 to the opposite side of the piston 202, 302 via one or more of the passages 46, 48, 208, 308 defined by the piston 202, 302.

Moving the damper assembly 200, 300 toward the extended position decreases fluid pressure at the first surface 204, 304 and increases fluid pressure at the second surface 206, 306. Moving the damper assembly 200, 300 toward the compressed position increases fluid pressure at the first surface 204, 304 and decreases fluid pressure at the second surface 206, 306. The first surface 204, 304 is between the second surface 206, 306 and the compression sub-chamber 42 of the working chamber 34. The second surface 206, 306 is between the first surface 204, 304 and the rebound sub-chamber 44 of the working chamber 34. As an example, the first surface 204, 304 may face the compression sub-chamber 42 of the working chamber 34 and the second surface 206, 306 may face the rebound sub-chamber 44 of the working chamber 34.

The piston 202, 302 defines one or more passages 46, 48, 208, 308, e.g., one or more first passages 208, 308, second passages 46, and third passages 48. The passages 46, 48, 208, 308 extend from the first surface 204, 304 of the piston 202, 302 to the second surface 206, 306 of the piston 202, 302. The passages 46, 48, 208, 308 provide fluid communication between the compression sub-chamber 42 and the rebound sub-chamber 44 of the cylinder 32, i.e., such that fluid may flow from the compression sub-chamber 42 to the rebound sub-chamber 44 in a first direction D1, or vice versa in a second direction D2 opposite the first direction D1. The passages 46, 48, 208, 308 may be spaced circumferentially about the axis A1. A pair of the first passages 208, 308 may be spaced opposite each other, i.e., at generally 180 degrees spacing about the axis A1. The second passages 46 and the third passages 48 may be between the first passages 208, 308, e.g., circumferentially about the axis A1. The adjectives "first," "second," and "third" are used as identifiers and are not intended to indicate significance or order. For example, the piston 202, 302 may include the first passages 208, 308 and the third passages 48 and not the second passages 46. As another example, the first direction D1 is shown in the drawings as being from the first surface 204, 304 to the second surface 206, 306, however, the first direction D1 may be from the second surface 206, 306 to the first surface 204, 304.

The first surface 204, 304 and/or the second surface 206, 306 may each include one or more ribs 50, 52, 54, 56, e.g., an inner rib 50, 52 and one or more outer ribs 54, 56. The ribs 50, 52, 54, 56 extend away from the piston 202, 302 to respective distal ends 55, 57. The outer ribs 54, 56 may surround second passages 46 and the third passages 48. For example, each outer rib 54 of the second surface 206, 306 may surround a respective one of the second passages 46. As another example, each outer rib 56 of the first surface 204, 304 may surround a respective one of the third passages 48. The inner ribs 50, 52 may be closer to the center opening 40 of the piston 202, 302 than the outer ribs 54, 56. The inner rib 50, 52 may be elongated about the axis A1, e.g., surrounding the center opening 40.

The second surface 206, 306 and/and or the first surface 204, 304 may each define a channel 58, 60. The channels 58, 60 may be radially between the respective inner rib 50, 52s and outer ribs 54, 56. The channels 58, 60 may be elongated about the axis A1, e.g., surrounding the center opening 40 and the respective inner rib 50, 52.

The second surface 206, 306 and/or the first surface 204, 304 may each define blow off entry areas 62, 64 where fluid may enter the second passages 46 or third passages 48. For example, the blow off entry areas 62, 64 of the second surface 206, 306 may be at the second surface 206, 306 surrounding the third passages 48. As another example, the blow off entry area 62, 64 of the first surface 204, 304 may be at the first surface 204, 304 surrounding the second passages 46. The blow off entry areas 62, 64 may be spaced from the distal ends 55, 57 of the respective outer ribs 54, 56 along the axis A1. For example, the blow off entry areas 62, 64 may be closer to a radially extending centerline CL centered on the piston 202, 302 along the axis A1.

The second surface 206, 306 and/or the first surface 204, 304 define slopes 210, 212, 310, 312 at the first passages 208, 308. The slopes 210, 310 of the second surface 206, 306 and the slopes 212, 312 of the first surface 204, 304 surround the first passages 208, 308, e.g., at respective opposite ends of the first passages 208, 308. The slopes 210, 212, 310, 312 extend transversely relative to the axis A1, i.e., other than perpendicular. For example, the second surface 206, 306 at radially inner edges 218, 318 of the first passages 208, 308 may be spaced along the axis A1 from the second surface 206, 306 at radially outer edges 220, 320 of the first passages 208, 308. As another example, the first surface 204, 304 at radially inner edges 218, 318 of the first passages 208, 308 may be spaced along the axis A1 from the first surface 204, 304 at radially outer edges 220, 320 of the first passages 208, 308.

Figure 3A:
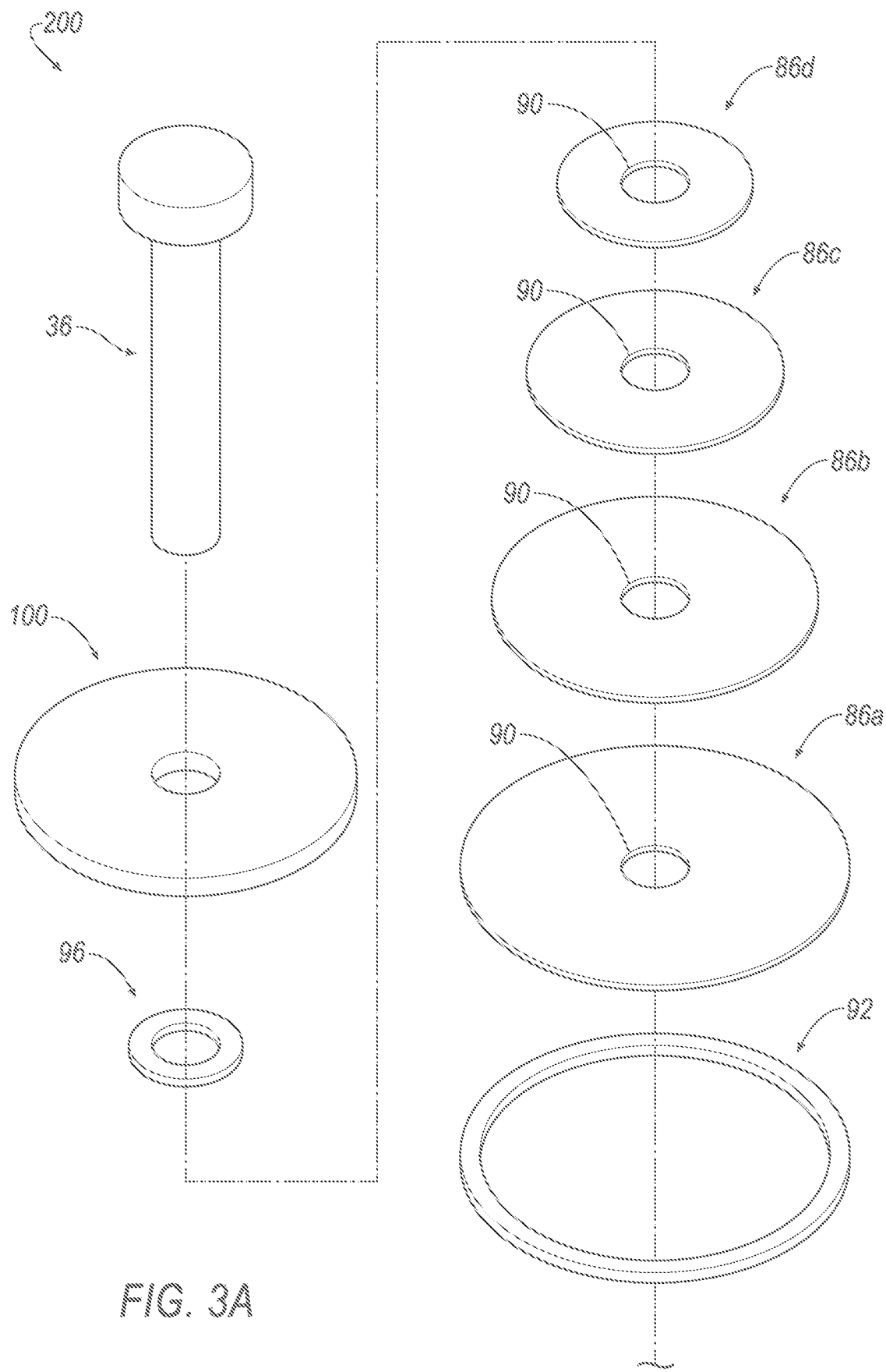
FIG. 3A is an exploded view of components of a damper assembly.
Figure 3B:
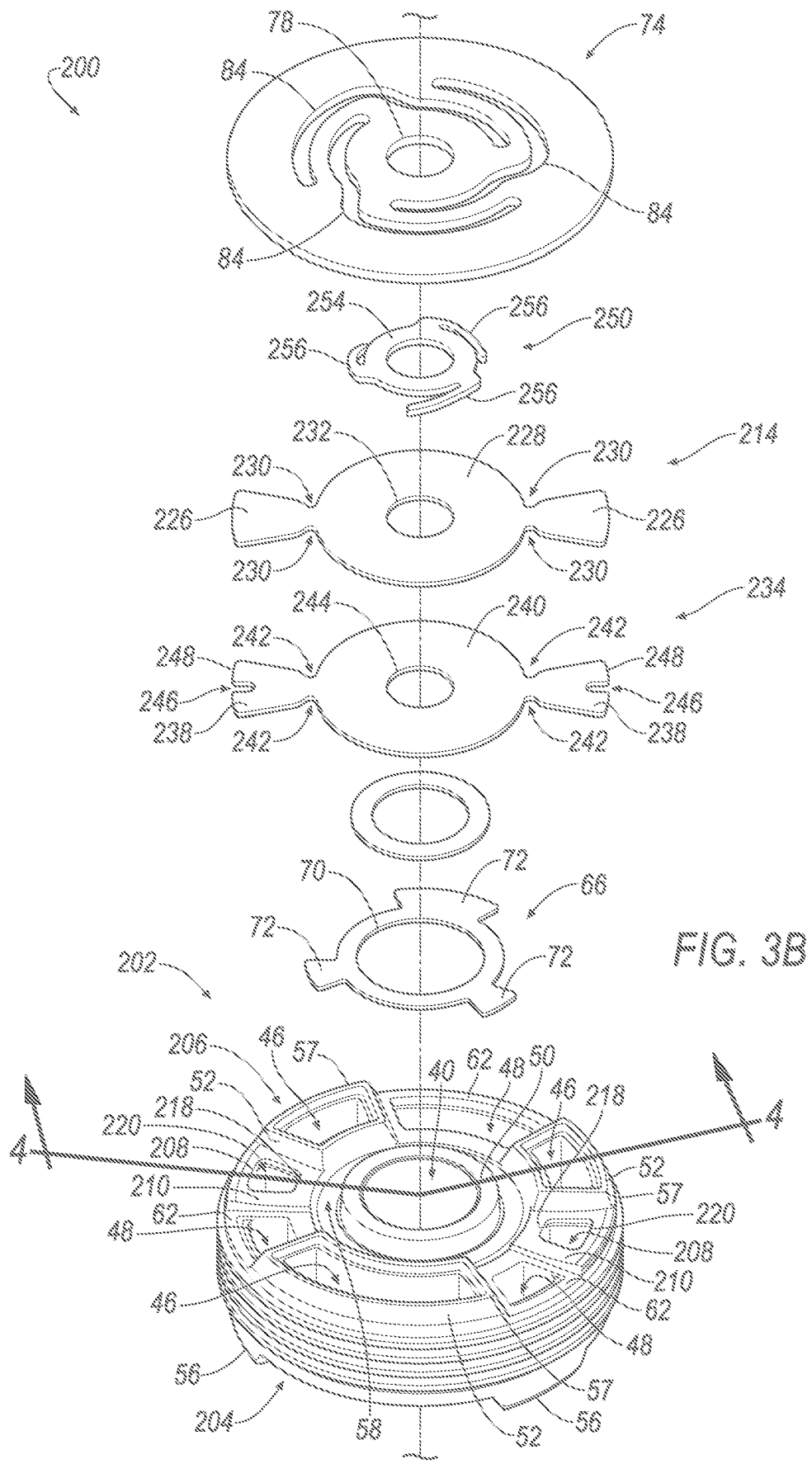
FIG. 3B is a continuation of the exploded view of FIG. 3A.
Figure 4:
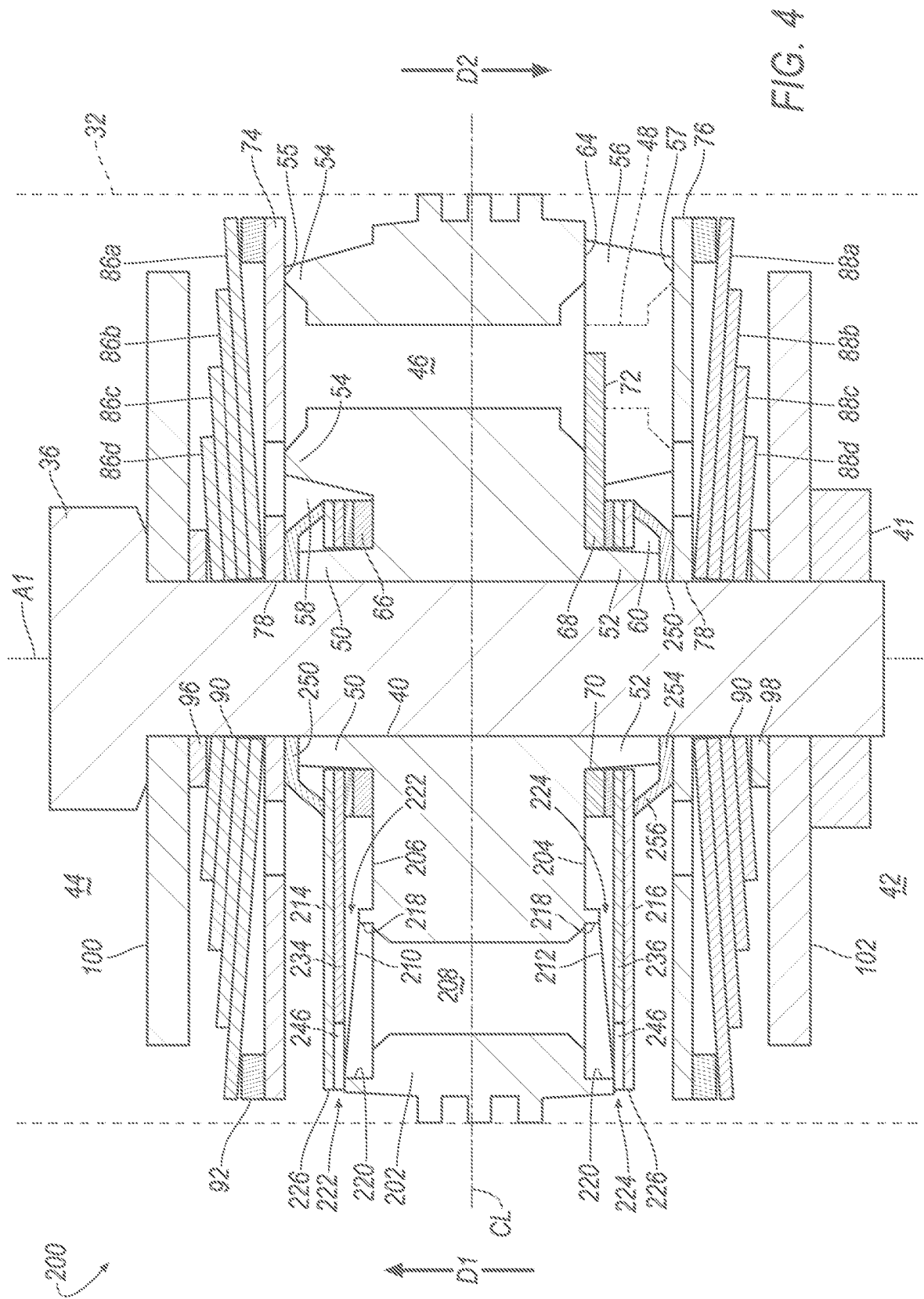
FIG. 4 is a cross-section of a portion of the damper assembly taken along line 4-4 of FIG. 3B.

With reference to the piston 202 illustrated in FIGS. 3B and 4, the slope 210, 212 may be concave, i.e., extending radially away from the axis A1 and along the axis A1 away from the centerline CL. For example, the second surface 206 at the radially inner edges 218 of the first passages 208 may be between the second surface 206 at radially outer edges 220 of the first passages 208 and the centerline CL along the axis A1. As another example, the first surface 204 at the radially inner edges 218 of the first passages 208 may be between the first surface 204 at radially outer edges 220 of the first passages 208 and the centerline CL along the axis A1. An angle between the slope 210, 212 and the axis A1 may be, for example, 91-100 degrees, e.g., as measured on the side of the slope 210, 212 proximate the centerline CL.

Figure 5A:
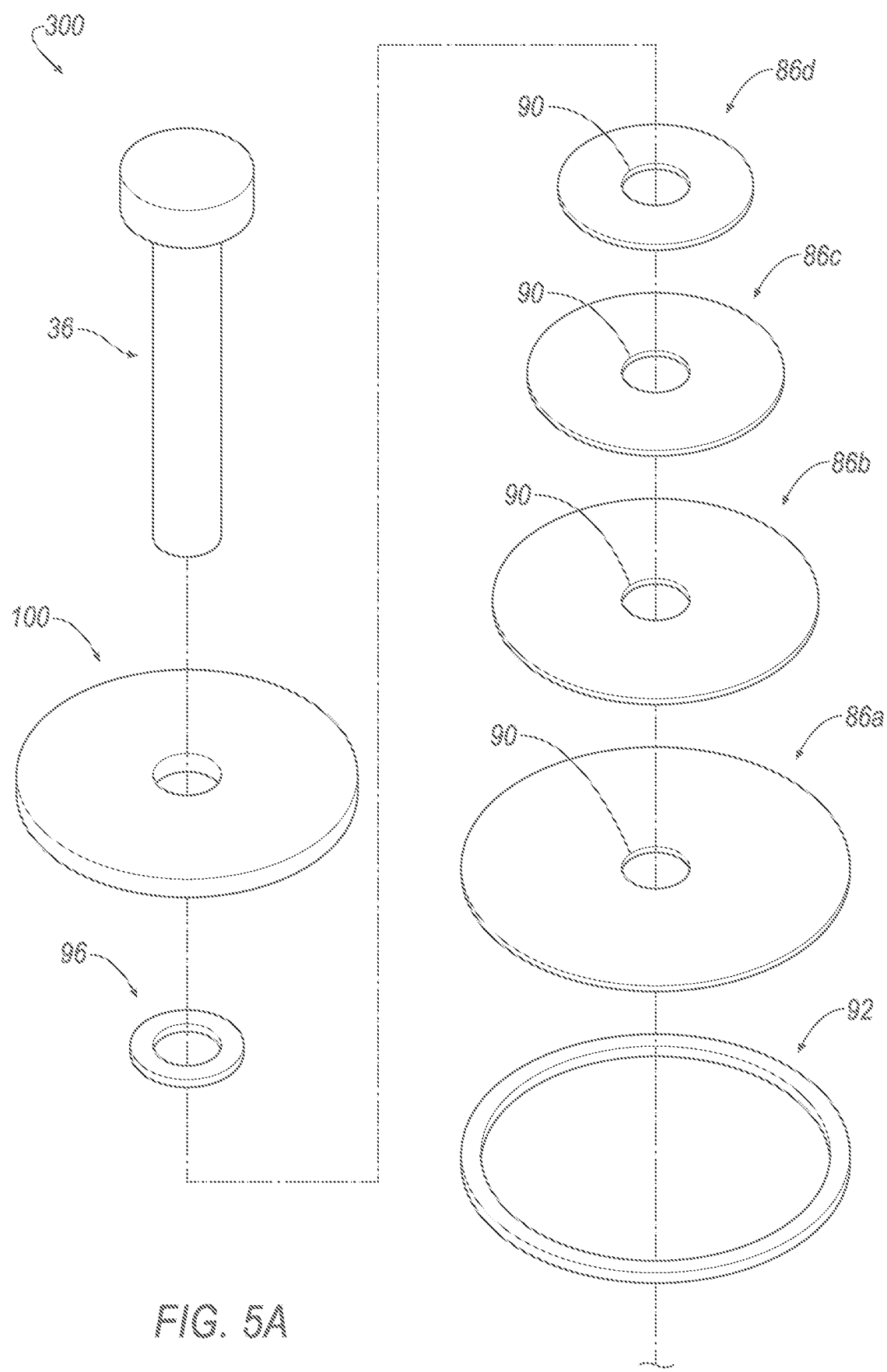
FIG. 5A is an exploded view of components of another damper assembly.
Figure 5B:
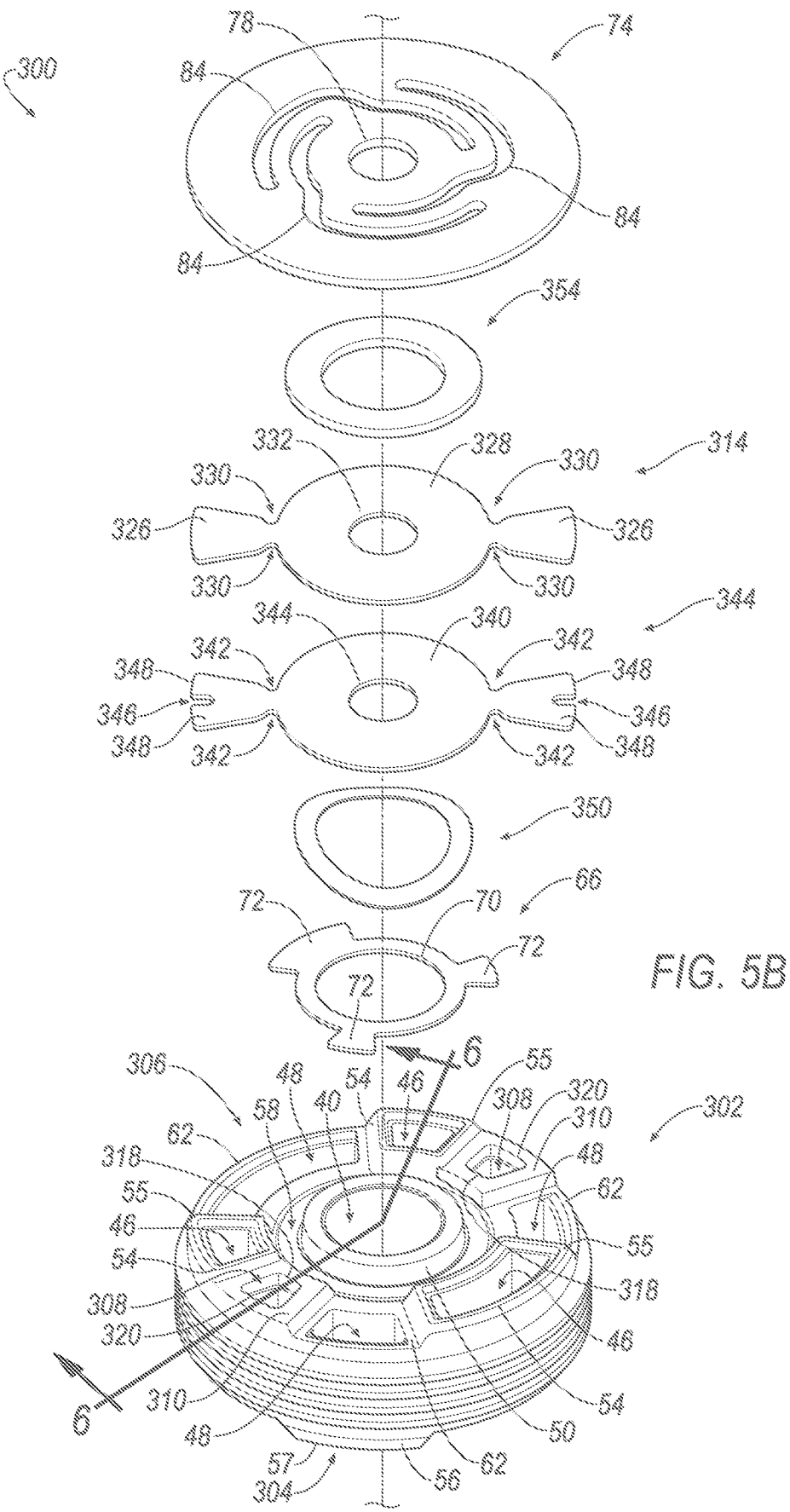
FIG. 5B is a continuation of the exploded view of FIG. 5A.

With reference to the piston 302 illustrated in FIGS. 5B and 6, the slope 310, 312 may be convex, i.e., extending radially away from the axis A1 and along the axis A1 toward the centerline CL. For example, the second surface 306 at the radially outer edges 320 of the first passages 308 may be between the second surface 306 at radially inner edges 318 of the first passages 308 and the centerline CL along the axis A1. As another example, the first surface 304 at the radially outer edges 320 of the first passages 308 may be between the first surface 304 at radially inner edges 318 of the first passages 308 and the centerline CL along the axis A1. An angle between the slope 310, 312 and the axis A1 may be, for example, 80-89 degrees, e.g., as measured on the side of the slope 210, 212, 310, 312 proximate the centerline CL.

Returning to FIGS. 3A-6, check discs 214, 216, 314, 316, e.g., a first check disc 214, 314 and a second check disc 216, 316, increase a resistance to movement in response to fluid flow past the respective check disc 214, 216, 314, 316 and/or a difference in fluid pressure on one side of the check disc 214, 216, 314, 316 relative to an opposite side. The fluid flow and/or difference in fluid pressure may translate or flex the check disc 214, 216, 314, 316 and decease a size of an opening 222, 224, 322, 324 (illustrated in FIGS. 4 and 6) through which fluid may flow and thereby increase resistance to movement. For example, the check discs 214, 216, 314, 316 may be movable from an unflexed position illustrated in FIGS. 4, 6-8, 21, and 23 to a flexed position illustrated in FIGS. 10, 11, 13, 14, 16, 21 and 24.

The check discs 214, 216, 314, 316 may include extensions 226, 326 that extend radially outward from a base ring 228, 328 of the respective check disc 214, 216, 314, 316. The extensions 226, 326 may be opposite each other, e.g., spaced from each other at generally 180 degrees around the axis A1. The check disc 214, 216, 314, 316 may be bow-tie shaped. For example, a width of the extensions 226, 326 may increase along the extensions 226, 326, e.g., such that the extensions 226, 326 get wider as the extensions 226, 326 extend away from the respective base ring 228, 328. Each extension 226, 326 may include a pair of contractions 230, 330. The contractions 230, 330 may be proximate the respective base ring 228, 328. The contractions 230, 330 provide decreased width to the extensions 226, 326 that decreases stiffness of the check disc 214, 216, 314, 316 at the contractions 230, 330, e.g., such that the check disc 214, 216, 314, 316 flexes at the contractions 230, 330. Although illustrated as each having two extensions 226, 326, the check discs 214, 216, 314, 316 may each include only one, or more than two, extensions 226, 326.

The amount of flex and/or translation of the check disc 214, 216, 314, 316 (and the associated decrease in size of the opening 222, 224, 322, 324) may be proportional to a rate of fluid flow and/or a pressure differential between the compression sub-chamber 42 and the rebound sub-chamber 44 of the cylinder 32. For example, the greater the rate of fluid flow and/or difference in fluid pressure, the greater the amount of flex and/or translation of the check disc 214, 216, 314, 316. A threshold rate of fluid flow and/or difference in fluid pressure may be required to flex and/or translate the check discs 214, 216, 314, 316. The check discs 214, 216, 314, 316 may not increase resistance to movement until the threshold rate of fluid flow and/or difference in fluid pressure is achieved.

The check discs 214, 216, 314, 316 may be supported by the piston 202, 302 and/or the rod 36, e.g., via a center opening 232, 332 of each of the check discs 214, 216, 314, 316. The piston 202, 302 may be between the rod 36 and the check discs 214, 216, 314, 316. For example, the inner rib 50 of the second surface 206, 306 may be in the center opening 232, 332 of the first check disc 214, 314 between the rod 36 and such check disc 214, 314. As another example, the inner rib 52 of the first surface 204, 304 may be in the center opening 232, 332 of the second check disc 216, 316 between the rod 36 and such check disc 216, 316. The check discs 214, 216, 314, 316 are supported at the slope 210, 212, 310, 312. For example, the extensions 226, 326 of the first check disc 214, 314 may cover the slopes 210, 310 of the second surface 206, 306. As another example the extensions 226, 326 of the second check disc 216, 316 may cover the slopes 212, 312 of the first surface 204, 304.

With reference to FIGS. 4, 7, 10, 13, and 16, the check discs 214, 216 may movable from the unflexed positions toward the inner edges 218 of the first passages 208 to the flexed position. For example, the extensions 226 of the check discs 214, 216 in the unflexed positions may be farther from inner edges 218 than in the flexed position.

With reference to FIGS. 6, 8, 11, 14, 17, 21, and 25 the check discs 314, 316 may movable from the unflexed positions toward the outer edges 320 of the first passages 308 to the flexed position. For example, the extensions 326 of the check discs 314, 316 in the unflexed positions may be farther from outer edges 320 than in the flexed position.

The first check disc 214, 314 selectively restricts fluid flow through the first passages 208, 308 in the first direction D1, i.e., depending on a direction and an amount of fluid pressure and/or speed of fluid flow applied to the first check disc 214, 314. The first check disc 214, 314 selectively permits fluid through the first passages 208, 308 by controlling a size of the opening 222, 322 between the first check disc 214, 314 and another component of the damper assembly 200, 300, such as the slope 210, 310 of the piston 202, 302.

When the damper assembly 200, 300 is moved toward the extended position the volume of the compression sub-chamber 42 is increased and the volume of the rebound sub-chamber 44 is decreased, thereby creating a pressure differential where fluid pressure is greater in the rebound sub-chamber 44 than in the compression sub-chamber 42. Such pressure differential and/or fluid flow caused by such pressure differential may move the first check disc 214, 314 toward the piston 202, 302. Movement of the first check disc 214, 314 toward the piston 202, 302 decreases the size of the opening 222, 322 therebetween through which fluid may flow. Decreasing the size of the opening 222, 322 increases resistance to motion provided the damper assembly 200, 300 by limiting fluid flow through the first passages 208, 308.

The first check disc 214, 314 may be moved toward the piston 202, 302 only when the pressure differential and/or rate of fluid flow is greater than a threshold amount. The threshold amount may be determined based on desired response characteristics of the damper assembly 200, 300, and the first check disc 214, 314 may be designed, e.g., via geometry such as thickness, material type, etc., to flex at the threshold amount. For example, increasing a thickness of the first check disc 214, 314 and/or selecting a stiffer material for the first check disc 214, 314 may increase the threshold amount required to decrease the size of the opening. Decreasing the thickness of the first check disc 214, 314 and/or selecting a more flexible material for the first check disc 214, 314 may decrease the threshold amount required to decrease the size of the opening 222, 322.

When the damper assembly 200, 300 is moved toward the compressed position the volume of the compression sub-chamber 42 is reduced and the volume of the rebound sub-chamber 44 is increased, thereby creating a pressure differential where fluid pressure is greater in the compression sub-chamber 42 than in the rebound sub-chamber 44. Such pressure differential, and/or fluid flow caused by such pressure differential, may move the first check disc 214, 314 away from the piston 202, 302 and may not decease the size of the opening 222, 322.

The second check disc 216, 316 selectively restricts fluid flow through the first passages 208, 308 in the second direction D2, i.e., depending on a direction and an amount of fluid pressure and/or speed of fluid flow applied to the second check disc 216, 316. The second check disc 216, 316 selectively permits fluid through the second passages 46 by controlling a size of the opening 224, 324 between the second check disc 216, 316 and another component of the damper assembly 200, 300, such as the slope 212, 312 of the piston 202, 302.

When the damper assembly 200, 300 is moved toward the compressed position the second check disc 216, 316 may be moved toward the piston 202, 302. Movement of the second check disc 216, 316 toward the piston 202, 302 decreases the size of the opening 224, 324 therebetween through which fluid may flow. Decreasing the size of the opening 224, 324 increases resistance to motion provided the damper assembly 200, 300 by limiting fluid flow through the second passages 46. The second check disc 216, 316 may be moved toward the piston 202, 302 only when the pressure differential and/or rate of fluid flow is greater than a threshold amount. The threshold amount may be determined based on desired response characteristics of the damper assembly 200, 300. The second check disc 216, 316 may be designed, e.g., via geometry such as thickness, material type, etc., to flex at the threshold amount, e.g., as described for the first check disc 214, 314.

The damper assembly 200, 300 may include one or more orifice discs 234, 236, 334, 336, e.g., a first orifice disc 234, 334 and a second orifice disc 236, 336. The orifice discs 234, 236, 334, 336 may include extensions 238, 338 that extend radial outward from a base ring 240, 340 of the respective check disc 214, 216, 314, 316. The extensions 238, 338 may be opposite each other, e.g., spaced from each other at generally 180 degrees around the axis A1. The orifice discs 234, 236, 334, 336 may be bow-tie shaped. For example, a width of the extensions 238, 338 may increase along the extensions 238, 338, e.g., such that the extensions 238, 338 get wider as the extensions 238, 338 extend away from the base ring 240, 340. Each extension 238, 338 may include a pair of contractions 242, 342. The contractions 242, 342 may be proximate the base ring 240, 340. The contractions 242, 342 provide decreased width to the extensions 238, 338 that decreases stiffness of the orifice disc 234, 236, 334, 336 at the contractions 242, 342, e.g., such that the orifice disc 234, 236, 334, 336 flexes at the contractions 242, 342.

The orifice discs 234, 236, 334, 336 may be supported by the rod 36 and/or the piston 202, 302, e.g., via a center opening 244, 344. The inner rib 50, 52 may be in the center openings 244, 344 of the orifice discs 234, 236, 334, 336. The first orifice disc 234, 334 may be between the first check disc 214, 314 and the piston 202, 302 along the axis A1. The first orifice disc 234, 334 may abut the first check disc 214, 314. The second orifice disc 236, 336 may be between the second check disc 216, 316 and the piston 202, 302 along the axis A1. The second orifice disc 236, 336 may abut the second check disc 216, 316. The extensions 238, 338 of the orifice discs 234, 236, 334, 336 may be aligned with the extensions 226, 326 of the check discs 214, 216, 314, 316, e.g., to cover the first passages 208, 308 at the slope 210, 310 of the second surface 206, 306 and/or the slope 212, 312 of the first surface 204, 304.

Each orifice disc 234, 236, 334, 336 defines one or more orifices 246, 346. The orifices 246, 346 may be spaced circumferentially around the orifice discs 234, 236, 334, 336. The orifices 246, 346 permit fluid flow axially and/or radially relative to the axis A1 of the damper assembly 200, 300. Each orifice 246, 346 may be open in a radial direction. For example, orifices 246, 346 may extend radially inward from outer edges 248, 348 of the extensions 238, 338 of the respective orifice disc 234, 236, 334, 336, e.g., such that fluid may flow radially into the orifices 246, 346 at the outer edges 248, 348.

The orifice discs 234, 236, 334, 336 may abut the piston 202, 302 and the check discs 214, 216, 314, 316. For example, the first orifice disc 234, 334 may be between, and abut, the first check disc 214, 314 and piston 202, 302 with the orifice 246, 346 at the outer edge 220, 320 of the first passages 208, 308. The second orifice disc 236, 336 may be between, and abut, the second check disc 216, 316 and piston 202, 302 with the orifice 246, 346 at the outer edge 220, 320 of the first passages 208, 308. The orifices 246, 346 enables fluid flow through the first passages 208, 308 by maintaining a minimum size to the openings 222, 224, 322, 324 between the check discs 214, 216, 314, 316 and piston 202, 302 when the check discs 214, 216, 314, 316 are in the flexed positions. For example, the minimum size of the opening 222, 224, 322, 324 may be equal to a radial flow area of the orifice 246, 346.

Figure 3C:
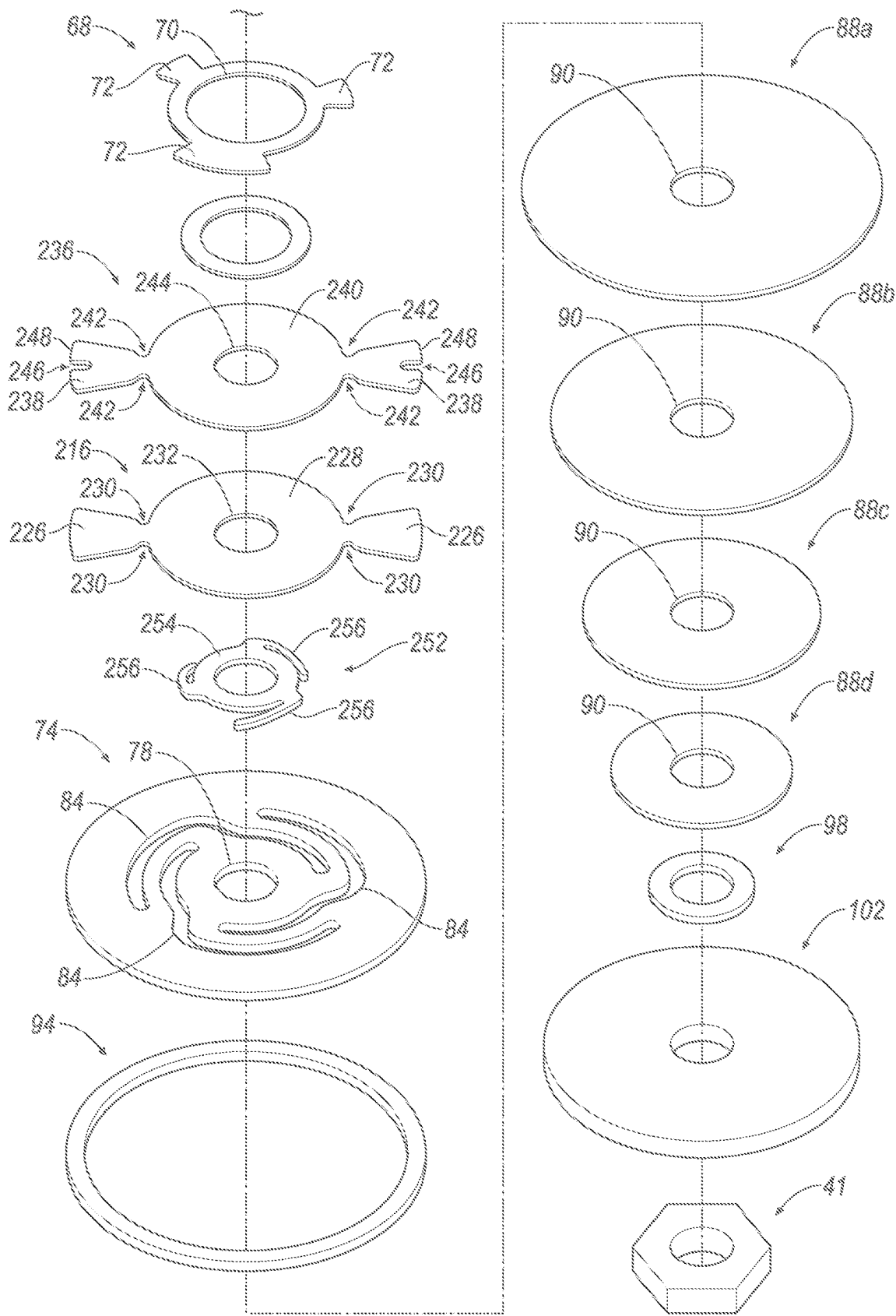
FIG. 3C is a continuation of the exploded view of FIG. 3B.

With reference to FIGS. 3B-4, springs 250, 252 may urge the check discs 214, 216 and the orifice discs 234, 236 toward the piston 202. For example, a first spring 250 may urge the first check disc 214 toward the second surface 206 of the piston 202. As another example, a second spring 252 may urge the second check disc 216 and the second orifice disc 236 toward the first surface 204 of the piston 202.

Each of the springs 250, 252 may include a base 254 and a plurality of arms 256 extending circumferentially and axially from the base 254. The springs 250, 252 are made from an elastically deformable material, e.g., spring steel, plastic having suitable elastic properties. The arms 256 of the springs 250, 252 may abut the check discs 214, 216. For example, arms 256 of the first spring 250 may abut the first check disc 214. As another example, arms 256 of the second spring 252 may abut the second check disc 216.

Figure 5C:
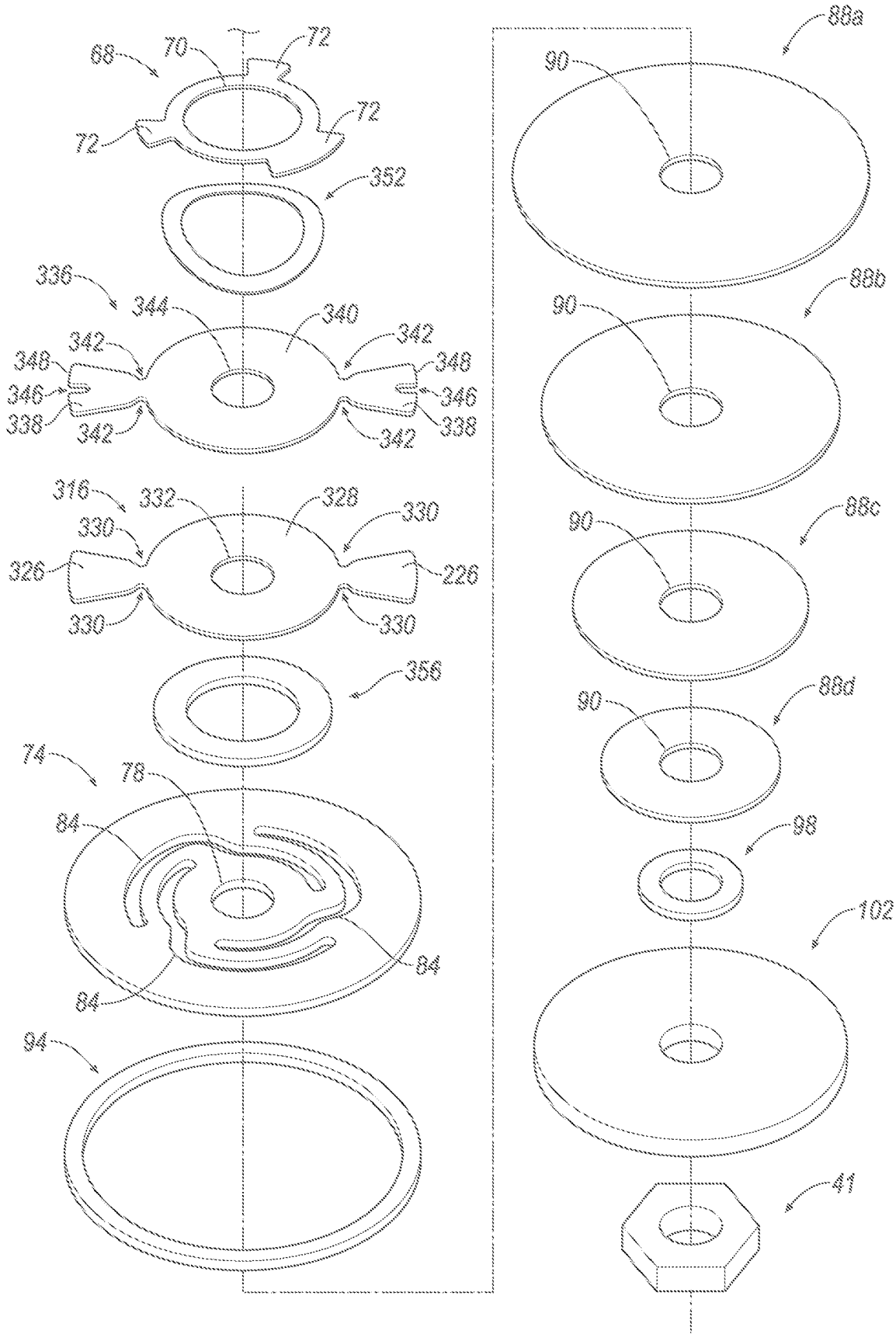
FIG. 5C is a continuation of the exploded view of FIG. 5B.

With reference to FIGS. 5B-6, springs 350, 352 may urge the check discs 314, 316 and the orifice discs 334, 336 away from the piston 302. For example, a first spring 350 may urge the first check disc 314 and the first orifice disc 234, 334 away from the second surface 306 of the piston 302. As another example, a second spring 352 may urge the second check disc 316 and the second orifice disc 336 away from the first surface 304 of the piston 302. The springs 350, 352 may be, for example, washer springs, bended disc springs, coil springs, or any suitable type. The springs 130, 132 may be an elastically deformably material, such as a suitable metal, plastic, etc.

Figure 19:
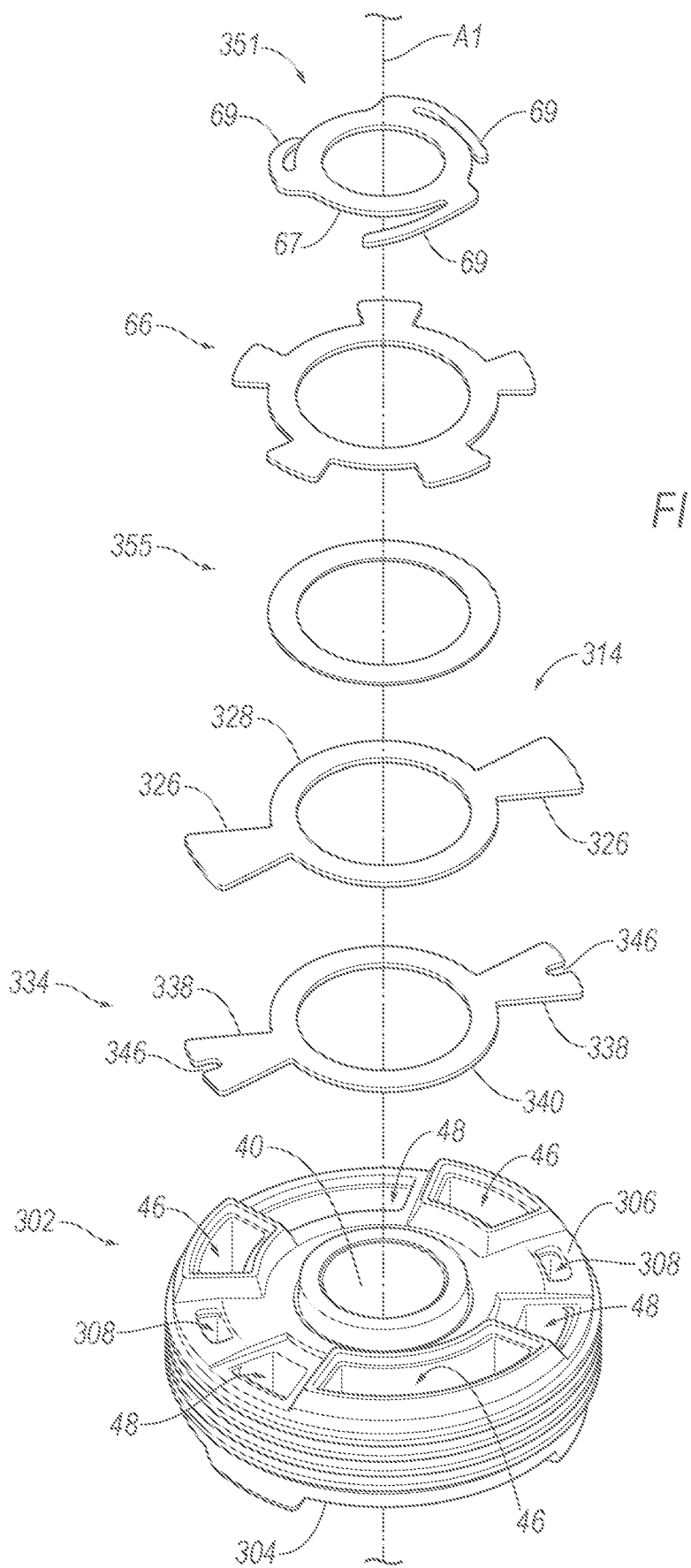
FIG. 19 is an exploded view of components of the damper assembly.
Figure 20:
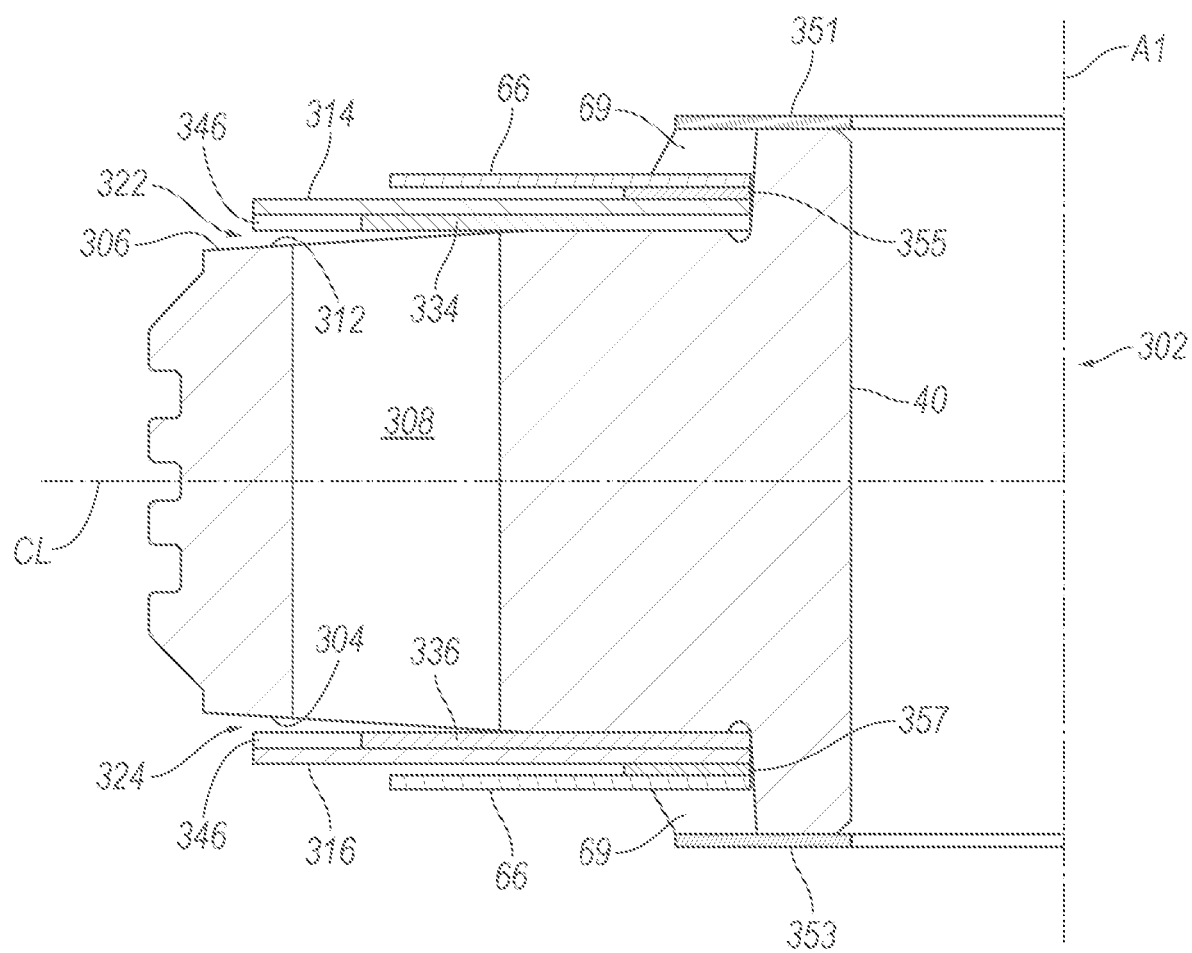
FIG. 20 is a cross section of the components of FIG. 19.

With reference to FIGS. 19 and 20, the orifice discs 334, 336 at the first surface 304 and the second surface 306 may abut the piston 302, e.g., without springs there between. For example, the orifice disc 336 at the first surface 304 may abut the first surface 304 radially inward of the first passage 308, e.g., proximate the center opening 40. The slope 312 of first surface 304 may extend away from the orifice disc 336, e.g., toward the centerline CL. The orifice disc 336 may be spaced from the first surface 304 at the slope 312 radially outward of the first passage 308. As another example, the orifice disc 334 at the second surface 306 may abut the second surface 306 radially inward of the first passage 308, e.g., proximate the center opening 40. The slope 310 of second surface 306 may extend away from the orifice disc 334, e.g., toward the centerline CL. The orifice disc 334 may be spaced from the second surface 306 at the slope 310 radially outward of the first passage 308. Fluid may fluid into and out of the first passage 308 via opening 322, 324 between the orifice discs 334, 336 and the respective first surface 304 or second surface 306 outward of the first passage 308.

Check discs 314, 316 may be axially outward of the orifice discs 334, 336 relative to the centerline CL. The check disc 316 at the first surface 304 may abut the orifice disc 336 opposite the first surface 304. The check disc 314 at the second surface 306 may abut the orifice disc 334 opposite the second surface 306. The check discs 334, 336 control the size of the openings 322, 324, e.g., in response to fluid flow and as described herein.

Spacer discs 355, 357 may be axially outward of the check discs relative 314, 316 to the centerline CL. The spacer disc 357 at the first surface 304 may abut the check disc 316 opposite 316 the orifice disc 336. The spacer disc 355 at the second surface 306 may abut the check disc 314 opposite the orifice disc 334. The spacer discs 355, 357 separate the check discs 314, 316 from restriction discs 66, 68.

The restriction discs 66, 68 may be axially outward of the spacer discs 355, 357 relative to the centerline CL. The restriction disc 68 at the first surface 304 may abut the spacer disc 357 opposite the check disc 316. The restriction disc 66 at the second surface 306 may abut the spacer disc 355 opposite the check disc 314. The restriction discs 66, 68 limit flow of fluid past the piston 302, e.g., as further described below.

The springs 351, 353 may be axially outward of the restriction discs 66, 68 relative to the centerline CL. Each of the springs 66, 68 may include a main body 67 and a plurality of arms 69 extending circumferentially and radially outward from the main body 67 and toward the piston 302 along the axis A1. The arms 69 of the springs 351, 353 may abut the restriction discs 66, 68. The arms 69 of the spring 353 at the first surface 304 may abut the restriction disc 68 opposite the spacer disc 357. The arms 69 of the spring 351 at the second surface 306 may abut the restriction disc 66 opposite the spacer disc 355. The springs 351, 353 urge the restriction discs 66, 68, the spacer discs 355, the check discs 314, 316, and the orifice discs 334, 336 toward the piston 302, e.g., toward the respective first surface 304 or second surface 306.

Blow off discs 74, 76 and spring discs 86a-86e, 88a-88e may be axially outward of the springs 351, 353. The blow discs 74, 76 and spring discs 86a-86e, 88a-88e control fluid flow through the 46 and the 48, e.g., as further described below.

Figure 22:
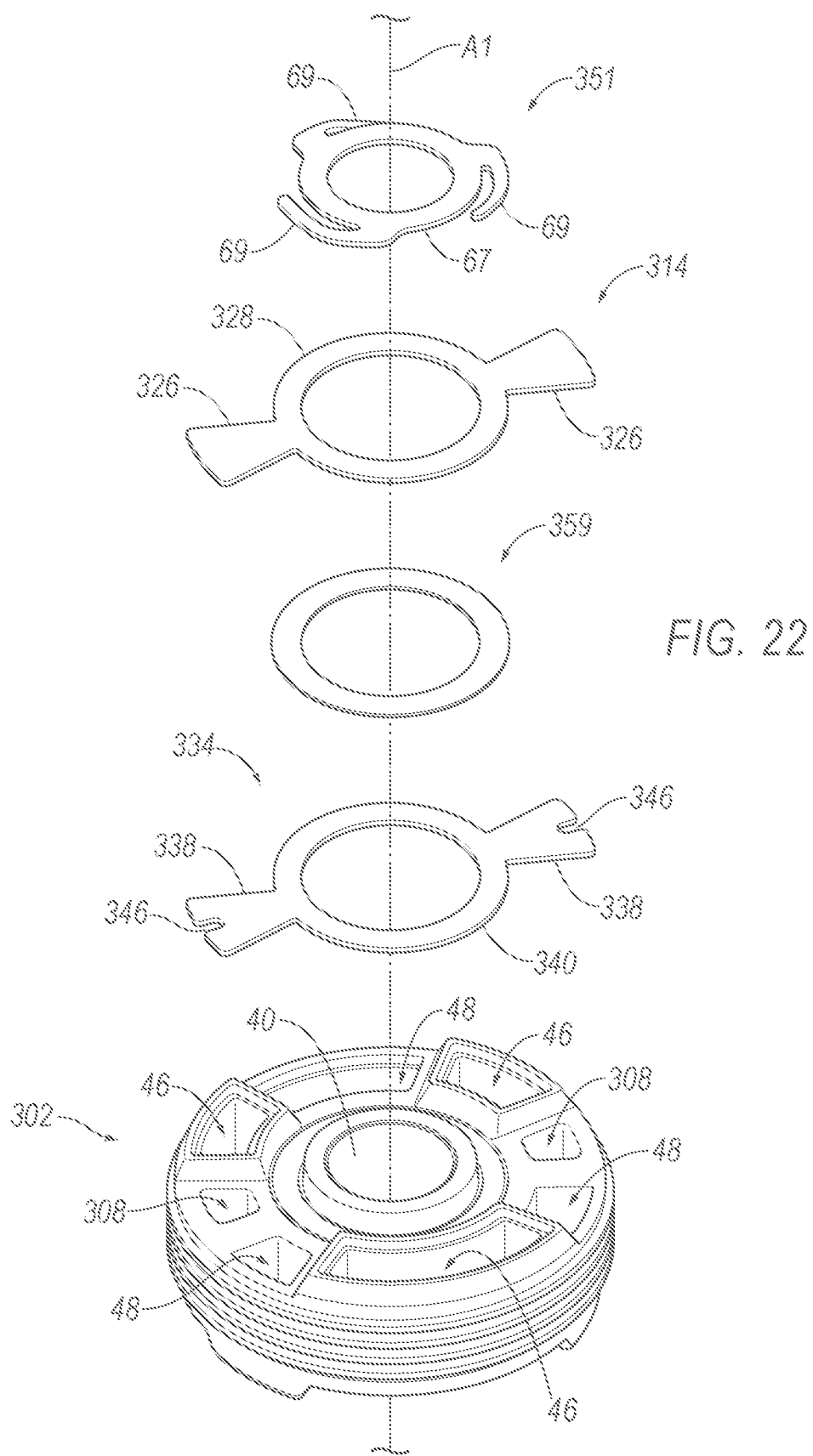
FIG. 22 is an exploded view of components of the damper assembly.
Figure 23:
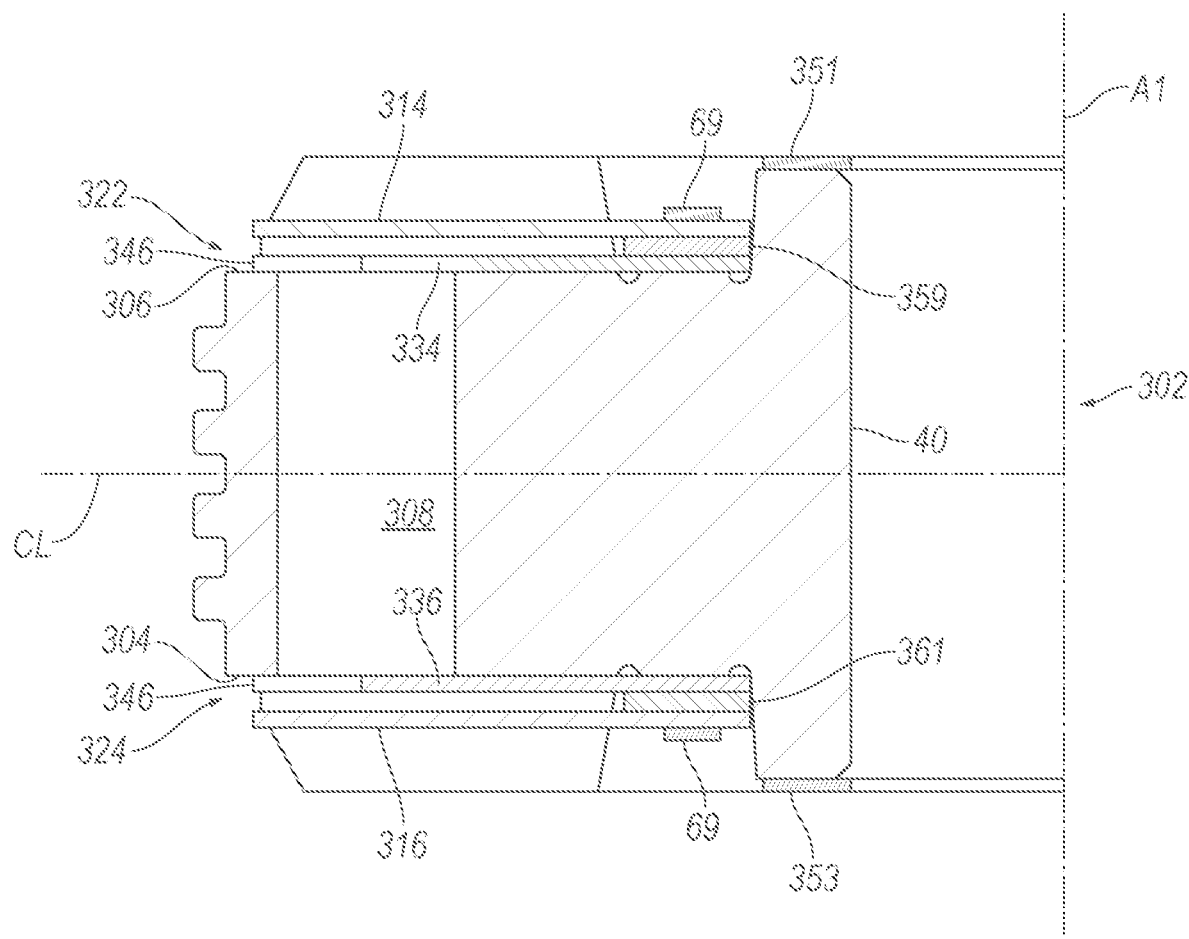
FIG. 23 is a cross section of the components of FIG. 22.

With reference to FIGS. 22 and 23, the orifice discs 334, 336 may abut the first surface 304 and the second surface 306 radially inward and radially outward of the first passage 308. The orifice discs 334, 336 may seal to the first surface 304 and the second surface 306 about a perimeter of the first passage, e.g., inhibit fluid flow therebetween. The fluid may enter and exit the first passages 308 via the orifices 346 of the orifice discs 334, 336. The first surface 304 and the second surface 306 may extend generally perpendicular to the axis A1.

Fulcrum discs 359, 361 may be axially outward of the orifice discs 334, 336 relative to the centerline CL. The fulcrum disc 361 at the first surface 304 may abut the orifice disc 336 opposite 316 the first surface 304. The fulcrum disc 359 at the second surface 306 may abut the orifice disc 334 opposite the second surface 306. The fulcrum discs 359, 361 separate the orifice discs 334, 336 from the check discs 314, 316 and enable fluid to axially and radially flow into and out of the orifices 346 of the orifice discs 334, 336.

Check discs 314, 316 may be axially outward of the fulcrum discs 359, 361 relative to the centerline CL. The check disc 316 at the first surface 304 may abut the fulcrum disc 361 opposite the orifice discs 336. The check disc 314 at the second surface 306 may abut the fulcrum disc 359 opposite the orifice discs 334. The check discs 334, 336 control the size of the openings 322, 324, e.g., in response to fluid flow and as described herein.

Springs 351, 353 may be axially outward of the check discs 334, 336 relative to the centerline CL. The arms 69 of the springs 351, 353 may abut the check discs 334, 336. The arms 69 of the spring 353 at the first surface 304 may abut the check discs 336 opposite the fulcrum disc 361. The arms 69 of the spring 351 at the second surface 306 may abut check discs 334 opposite the fulcrum disc 314. The springs 351, 353 urge the check discs 334, 336, the fulcrum discs 359, 361, and the orifice discs 334, 336 toward the piston 302, e.g., toward the respective first surface 304 or second surface 306.

Blow off discs 74, 76 and spring discs 86a-86e, 88a-88e may be axially outward of the springs 351, 353. The blow discs 74, 76 and spring discs 86a-86e, 88a-88e control fluid flow through the 46 and the 48, e.g., as further described below.

Returning to FIGS. 3A-6, the damper assembly 200, 300 may include one or more restriction discs 66, 68, e.g., a first restriction disc 66 and a second restriction disc 68. The restriction disc(s) 66, 68 limit flow of fluid past the piston 202, 302. The restriction discs 66, 68 may be supported by the rod 36 and/or the piston 202, 302. For example, the inner rib 50, 52 may be in center openings 70 of the respective restriction disc 66, 68. The first restriction disc 66 may be at the second surface 206, 306. The second restriction disc 68 may be at the first surface 204, 304. The restriction discs 66, 68 may each include extensions 72 that extend radially outward.

The first restriction disc 66 may cover a portion of the second passages 46. For example, the extensions 72 of the first restriction disc 66 may cover the second passages 46 at the second surface 206, 306. The second restriction disc 68 may cover a portion of the third passages 48. For example, the extensions 72 of the second restriction disc 68 may cover ends of the third passages 48 at the first surface 204, 304.

The damper assembly 200, 300 may include one or more blow off discs 74, 76, e.g., a first blow off disc 74 and/or a second blow off disc 76. The blow off discs 74, 76 may be supported by the rod 36. For example, each blow off disc 74, 76 may include a center opening 78 and the rod 36 may be in the center openings 78. The blow off discs 74, 76 may be axially outward of the check discs 214, 216, 314, 316 relative to the piston 202, 302. For example, the first check disc 214, 314 may be between the first blow off disc 74 and the piston 202, 302. As another example, the second check disc 216, 316 may be between the second blow off disc 76 and the piston 202, 302.

The blow off discs 74, 76 decrease a resistance to movement in response to fluid flow past the blow off disc 74, 76 and/or a difference in fluid pressure on one side of the blow off disc 74, 76 relative to an opposite side. The fluid flow and/or difference in fluid pressure may translate or flex the blow off disc 74, 76 to create, and/or increase a size of, an opening 80, 82 (illustrated in FIGS. 13, 14, 16, 17) through which fluid may flow. Increasing the size of the opening 80, 82 decreases resistance to movement by permitting a greater amount of fluid to flow from one sub-working chamber 34 to the other sub-working chamber 34. The amount of flex and/or translation of the blow off disc 74, 76, and the resulting increase in size of the opening 80, 82 may be proportional to a rate of fluid flow and/or the pressure difference between the compression sub-chamber 42 and the rebound sub-chamber 44 of the cylinder 32. For example, the greater the rate of fluid flow and/or difference in fluid pressure, the greater the amount of flex and/or translation of the blow off disc 74, 76 away the piston 202, 302, providing a greater magnitude of increase of the size the opening 80, 82 therebetween. A threshold rate of fluid flow and/or difference in fluid pressure may be required to flex and/or translate the blow off discs 74, 76. The blow off discs 74, 76 may not decrease resistance to movement until the threshold rate of fluid flow and/or difference in fluid pressure is achieved.

Each blow off disc 74, 76 may define one or more openings 84. The openings 84 permit fluid flow from one side of the respective blow off disc 74, 76 to another side of the respective blow off disc 74, 76. The opening 84 may decrease a stiffness of the blowoff disc 74, 76. The openings 84 may be arranged about the axis A1.

The openings 84 of each blow off disc 74, 76 may circumferentially overlap, i.e., two or more openings 84 may be along a common radius extending from the axis A1. Such openings 84 may be spaced from each other along the radius.

The first blow off disc 74 may be spaced from the second surface 206, 306 at the third passages 48, e.g., at the blow off entry areas 62. Spacing the first blow off disc 74 from the second surface 206, 306 at the third passages 48 permits fluid to freely flow into and out of the third passages 48, e.g., without inhibition of such flow by the first blow off disc 74.

The first blow off disc 74 selectively permits fluid flow out of the second passages 46, i.e., depending on an amount and direction of fluid pressure applied to the first blow off disc 74. For example, the first blow off disc 74 may selectively permit fluid flow through the second passages 46 in the first direction D1. The first blow off disc 74 selectively permits fluid flow by controlling the size of the opening 80 between the first blow off disc 74 and the piston 202, 302.

When the damper assembly 200, 300 is in the neutral state the first blow off disc 74 covers the second passages 46 at the second surface 206, 306 and restricts or inhibits fluid flow into, and out of, the second passages 46. The first blow off disc 74 in the neutral state may abut the second surface 206, 306 of the piston 202, 302 at the second passages 46, e.g., at distal ends 55 of the outer ribs 54 of the second surface 206, 306.

When the damper assembly 200, 300 is moved toward the compressed position the first blow off disc 74 may be moved away from the piston 202, 302 by the pressure differential and/or fluid flow resulting from such movement. Moving the first blow off disc 74 away from the piston 202, 302 creates the opening 80 between the piston 202, 302 and the first blow off disc 74. Fluid may flow out of the second passages 46 through the opening 80 to the rebound sub-chamber 44 of the cylinder 32. The first blow off disc 74 may be moved away from the piston 202, 302 only when the pressure differential is greater than a threshold amount. The threshold amount may be determined based on desired response characteristics of the damper assembly 200, 300, and the first blow off disc 74 and other components of the damper assembly 200, 300 may be designed, e.g., via geometry such as thickness, material type, etc., to flex at the threshold amount.

When the damper assembly 200, 300 is moved toward the extended position the first blow off disc 74 may be urged toward the piston 202, 302, not creating or enlarging the opening 80 between the piston 202, 302 and the first blow off disc 74.

The second blow off disc 76 may be spaced from the first surface 204, 304 at the second passages 46, e.g., at the blow off entry areas 64. Spacing the second blow off disc 76 from the first surface 204, 304 at the second passages 46 at permits fluid to freely flow into and out of the second passages 46, e.g., without inhibition of such flow by the second blow off disc 76.

The second blow off disc 76 selectively permits fluid flow out of the third passages 48 of the piston 202, 302, i.e., depending on an amount and direction of fluid pressure applied to the second blow off disc 76. For example, the second blow off disc 76 may selectively permit fluid flow through the third passages 48 in the second direction D2. The second blow off disc 76 selectively permits fluid flow by controlling the size of the opening 82 between the second blow off disc 76 and the piston 202, 302.

When the damper assembly 200, 300 is in the neutral state the second blow off disc 76 covers the third passage 48 at the first surface 204, 304 and restricts or inhibits fluid flow into, and out of, the third passage 48. The second blow off disc 76 in the neutral state may abut the first surface 204, 304 of the piston 202, 302 at the third passage 48, e.g. at distal ends 57 of the outer ribs 56 of the first surface 204, 304.

When the damper assembly 200, 300 is moved toward the extended position and pressure is greater in the rebound sub-chamber 44 of the cylinder 32 than in the compression sub-chamber 42, the second blow off disc 76 may be moved away from the piston 202, 302 and create the opening 82 between the piston 202, 302 and the second blow off disc 76. Fluid may flow out of the third passage 48 through the opening 82 to the compression sub-chamber 42 of cylinder 32. The second blow off disc 76 may be moved away from the piston 202, 302 only when the pressure differential and/or fluid flow rate is greater than a threshold amount. The threshold amount may be determined based on desired response characteristics of the damper assembly 200, 300, and the second blow off disc 76 and other components of the damper assembly 200, 300 may be designed, e.g., via geometry such as thickness, material type, etc., to flex at the threshold amount.

When the damper assembly 200, 300 is moved toward the compressed position and fluid pressure is greater in the compression sub-chamber 42 of the cylinder 32 than in the rebound sub-chamber 44 the second blow off disc 76 may be urged toward the piston 202, 302, not creating or enlarging the opening 82 between the piston 202, 302 and the second blow off disc 76.

Figure 25:
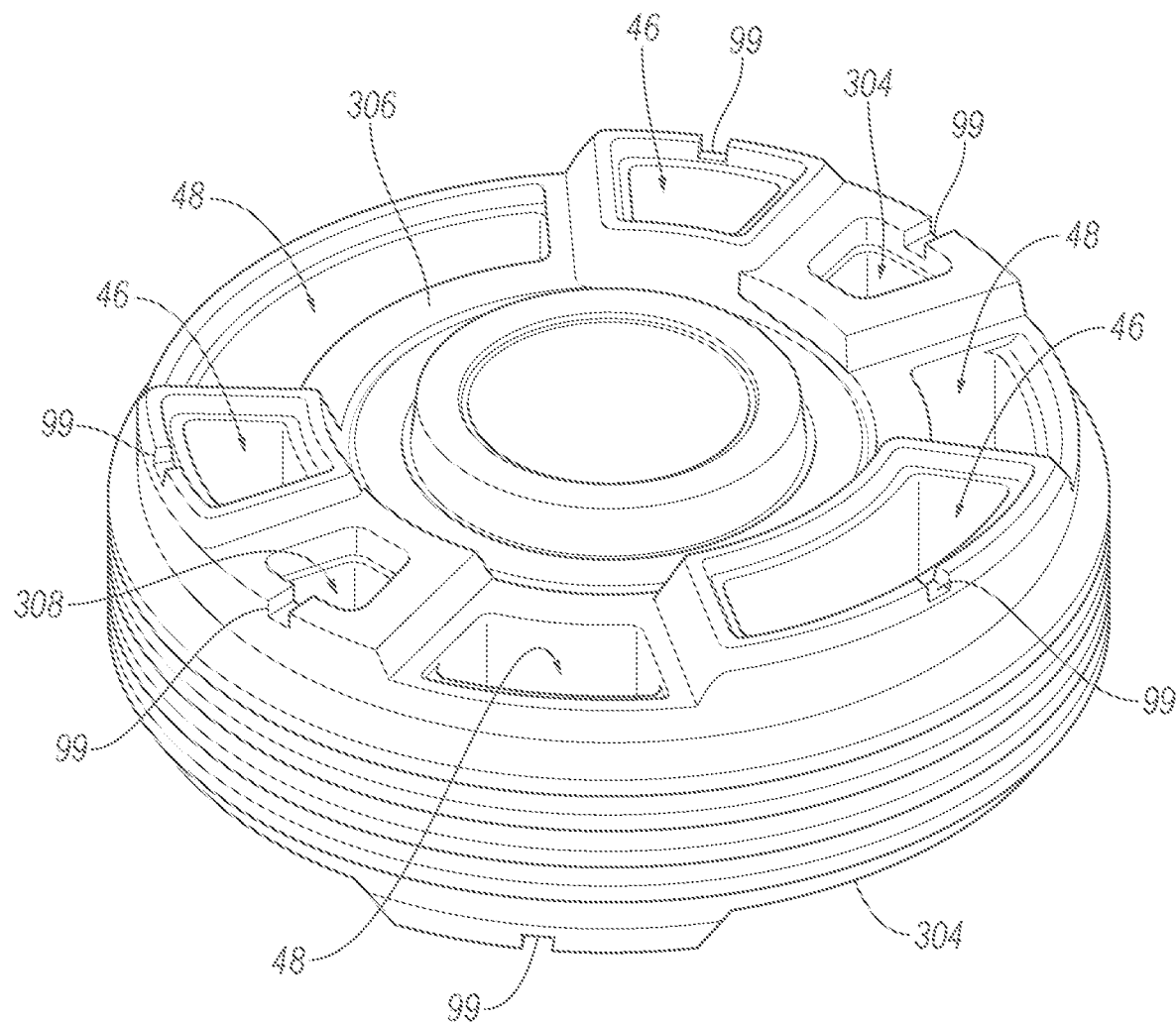
FIG. 25 is a perspective view of a piston of the damper assembly.

With reference to FIG. 25, the first surface 304 and/or the second surface 306 may each define one or more notches 99 in fluid communication with the passages 46, 48, 308. The notches 99 extend radially outward from the respective passage 46, 48, 308. The notches 99 provide bleed flow of fluid into and/or out of the passages 46, 48, 308. Notches 99 at the first surface 304 extending radially outward from the third passage 48 may provide fluid flow between the first surface 304 and the second blow off disc 76 when the second blow off disc 76 covers the third passage 48. Notches 99 at the second surface 306 extending radially outward from the second passage 46 provide flow between the second surface 306 and the first blow off disc 74 when the first blow off disc 74 covers the second passage 46. Notches 99 at the first surface 304 extending radial outward from the first passage 46 provide flow between the first surface 304 and second check disc 316. Notches 99 at the second surface 306 extending radial outward from the first passage 46 provide flow between the second surface 306 and first check disc 314. The notches 99 extending radially outward from the first passage 46 at the first surface 304 and the second surface 306 provide flow into the first passage 46 when the respect check disc 314, 316 is in the flexed position. The notches 99 extending radial outward from the first passage 46 at the first surface 304 and the second surface 306 may replace the orifice discs 334, 336, e.g., the damper assembly 300 may not include the orifice discs 334, 336 and the notches 99 may provide fluid flow when the respective check disc 314, 316 is flex toward the piston 302 (e.g., in place of the orifices 346 of the orifice discs 334, 336).

With reference to FIGS. 5A-6, the damper assembly 300 may include one or more spacer discs 354, 356. For example, a first spacer disc 354 may be between, and may abut, the first blow off disc 74 and the first check disc 214, 314. The first spacer disc 354 may cover the openings 84 of the first blow off disc 74. As another example, a second spacer disc 356 may be between, and may abut, the second blow off disc 76 and the second check disc 216, 316. The second spacer disc 356 may cover the openings 84 of the second blow off disc 76.

Returning to FIG. 3A-6, the damper assembly 200, 300 may include one or more spring discs 86a-86e, 88a-88e, e.g., one or more first spring discs 86a-86e and/or one or more second spring discs 88a-88e. The spring discs 86a-86e, 88a-88e may be supported by the rod 36. For example, the rod 36 may extend through center openings 90 of the spring discs 86a-86e, 88a-88e. The spring discs 86a-86e, 88a-88e are elastically deformable. For example, force applied to an outer edge of the spring discs 86a-86e, 88a-88e may cause the spring discs 86a-86e, 88a-88e to flex such that the outer edge is moved axially relative the respective center opening 90 of the spring disc 86a-86e, 88a-88e. The spring discs 86a-86e, 88a-88e are made from an elastically deformable material, e.g., spring steel, plastic having suitable elastic properties, etc.

The first spring discs 86a-86e urge the first blow off disc 74 toward the piston 202, 302, i.e., the first spring discs 86a-86e increase an amount of force required to flex the first blow off disc 74 away from the piston 202, 302. The second spring discs 88a-88e urge the second blow off disc 76 toward the piston 202, 302, i.e., the second spring discs 88a-88e increase an amount of force required to flex the second blow off disc 76 away from the piston 202, 302.

The spring discs 86a-86e, 88a-88e may progressively decrease in size as a function of the distance from the piston 202, 302 along the axis A1. For example, the first spring disc 86a closest to the piston 202, 302 may have a larger outer diameter than an outer diameter of the first spring disc 86b adjacent such first spring disc 86a, and so on. The first spring disc 86e farthest from the piston 202, 302 may have a diameter smaller that diameters of the other first spring discs 86a-86b. As another example, the spring discs 86a-86e, 88a-88e may be configured similar to a leaf spring.

The first spring disc 86a closest the piston 202, 302 may abut the first blow off disc 74 proximate the rod 36. The second spring disc 88a closest the piston 202, 302 may abut the second blow off disc 76 proximate the rod 36.

The spring discs 86a, 88a closest the piston 202, 302 may be spaced from the blow off discs 74, 76, at outer edges of the blow off discs 74, 76. For example, a first ring 92 may be between the first spring disc 86a and the first blow off disc 74 along the axis A1. As another example, a second ring 94 may be between the second spring disc 88a and the second blow off disc 76. The rings 92, 94 may be circular or any suitable shape. The rings 92, 94 may be metal, plastic, or any suitable material. The rings 92, 94 provide internal preload forces to the spring discs 86a-86e, 88a-88e. The rings 92, 94 may be radially outward of the openings 84 of the blow off discs 74, 76.

Each damper assembly 200, 300 may include a pair of fulcrum discs 96, 98. The fulcrum discs 96, 98 provide fulcrum points for the spring discs 86a-86e, 88a-88e. For example, one of the fulcrum discs 96 may abut the smallest first spring disc 86e opposite the adjacent larger first spring disc 86d. Such fulcrum disc 96 may have a smaller outer diameter than the abutting smallest first spring disc 86e. As another example, the other fulcrum disc 98 may abut the smallest second spring disc 88e opposite the adjacent larger second spring disc 88d. Such fulcrum 98 disc may have a smaller outer diameter than the smallest second spring disc 88e.

Each damper assembly 200, 300 may include a pair of preload spacers 100, 102. The preload spacers 100, 102 sandwich the piston 202, 302, the discs 74, 76, 86a-86e, 88a-88e, and other components of the damper assembly 200, 300 supported by the rod 36. For example, one of the preload spacers 100 may be axially outboard of one of the fulcrum discs 96 and the other preload spacers 102 may be axially outboard of the other fulcrum disc 98. The fastener 41 may fix to the rod 36 axially outboard of the preload spacer proximate the first surface 204, 304. The fastener 41 may be, for example, a threaded lock nut.

The preload spacers 100, 102 protect the spring discs 86a-86e, 88a-88e. The fastener 41 may confine the preload spacers 100, 102, the blow off discs 74, 76, the spring discs 86a-86e, 88a-88e, the piston 202, 302, etc., to a stack having a predetermined length. A thickness of the preload spacers 100, 102 may increase or decrease space available for the discs 74, 76, 86a-86e, 88a-88e, the piston 202, 302, etc.

Figure 8:
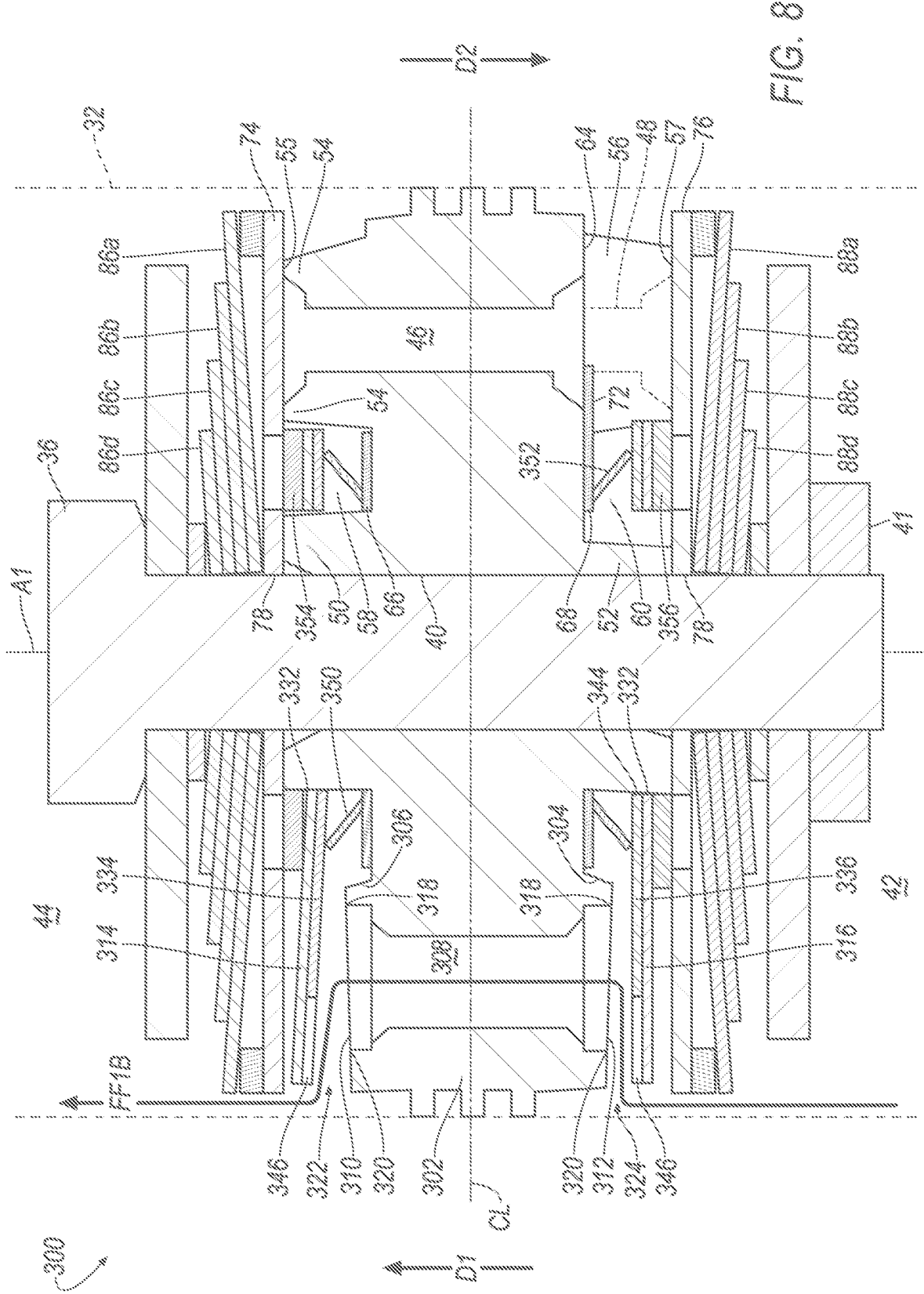
FIG. 8 is the cross section of FIG. 6 and illustrating a first fluid flow path when the damper assembly of FIGS. 5A-6 is moved toward a compressed position.

With reference to FIGS. 7, 8, 10, 11, 12, 13 first fluid flow paths FF1A, FF1B defined by the respective damper assemblies 200, 300 are illustrated. The first fluid flow paths FF1A, FF1B are defined when the respective damper assembly 200, 300 is moved toward the compressed position. The first fluid flow paths FF1A, FF1B in FIGS. 7 and 8 illustrate the respective damper assembly 200, 300 moved toward the compressed position when a fluid flow rate and/or a pressure differential between the compression sub-chamber 42 and the rebound sub-chamber 44 is less than a first threshold.

The first fluid flows path FF1A illustrated in FIG. 7 extends from the compression sub-chamber 42 around the preload spacer, the second spring discs 88a-88e, and the second blow off disc 76 to the openings 224 between the second check disc 216 and the piston 202. From the openings 224, the first fluid flow path FF1A extends through first passages 208 and out the openings between the first check disc 214 and the piston 202 to the rebound working chamber 34.

The first fluid flows path FF1B illustrated in FIG. 8 extends from the compression sub-chamber 42 around the preload spacer, the second spring discs 88a-88e, and the second blow off disc 76 to the opening 324 between the second check disc 316 and the piston 302. From the opening 324, the first fluid flow path FF1B extends through first passages 308 and out the openings between the first check disc 314 and the piston 302 to the rebound working chamber 34.

The first fluid flow paths FF1A, FF1B each define an area, e.g., perpendicular to the respective first fluid flow path FF1A, FF1B, through which fluid may flow. The defined area may be at narrowest portion of the respective first fluid flow path FF1A, FF1B. The defined area may include multiple areas. For example, the first fluid flow paths FF1A, FF1B may split into multiple sub-paths, e.g., with each sub-path extending through one of the first passages 208, 308. The sub-paths may each have a sub-area at a narrowest portion of the respective sub-path, and the defined area of the respective first fluid flow path FF1A, FF1B may be a combination of the areas of the sub-paths. Flow through the first fluid flow paths FF1A, FF1B may provide bleed flow to equalize the pressure differential between the compression sub-chamber 42 and the rebound sub-chamber 44.

Figure 9:
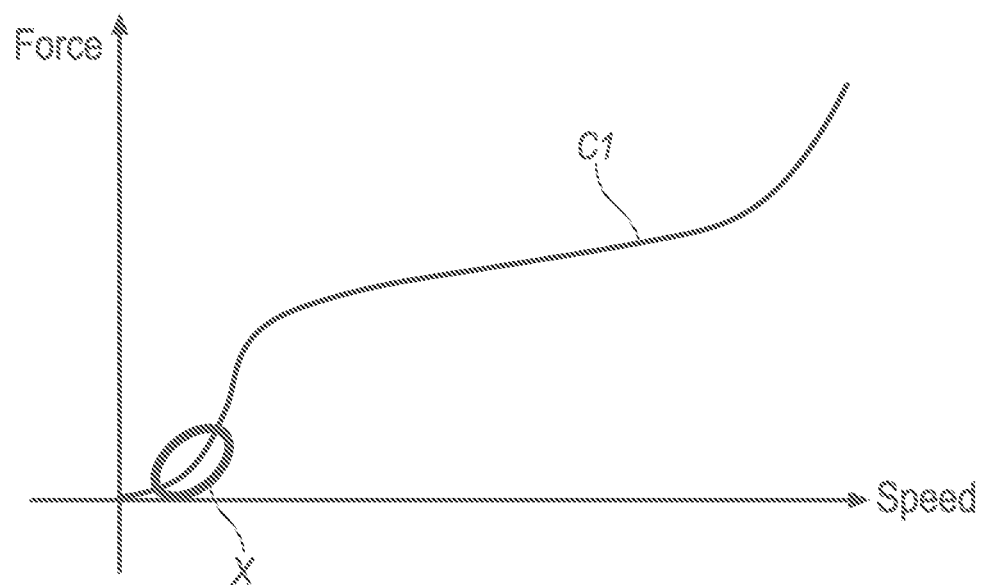
FIG. 9 is an illustration of a force response curve of the damper assembly moving toward the compressed position, the illustration identifying a first portion of the curve.

When the fluid flow rate and/or pressure differential between the compression sub-chamber 42 and the rebound sub-chamber 44 is less than the first threshold, the areas defined by the first fluid flow paths FF1A, FF1B provide resistance to movement of the piston 202, 302 by limiting a rate at which fluid may flow from the compression sub-chamber 42 to the rebound sub-chamber 44. Such resistance is illustrated in FIG. 9 by a section X of the curve C1.

Figure 10:
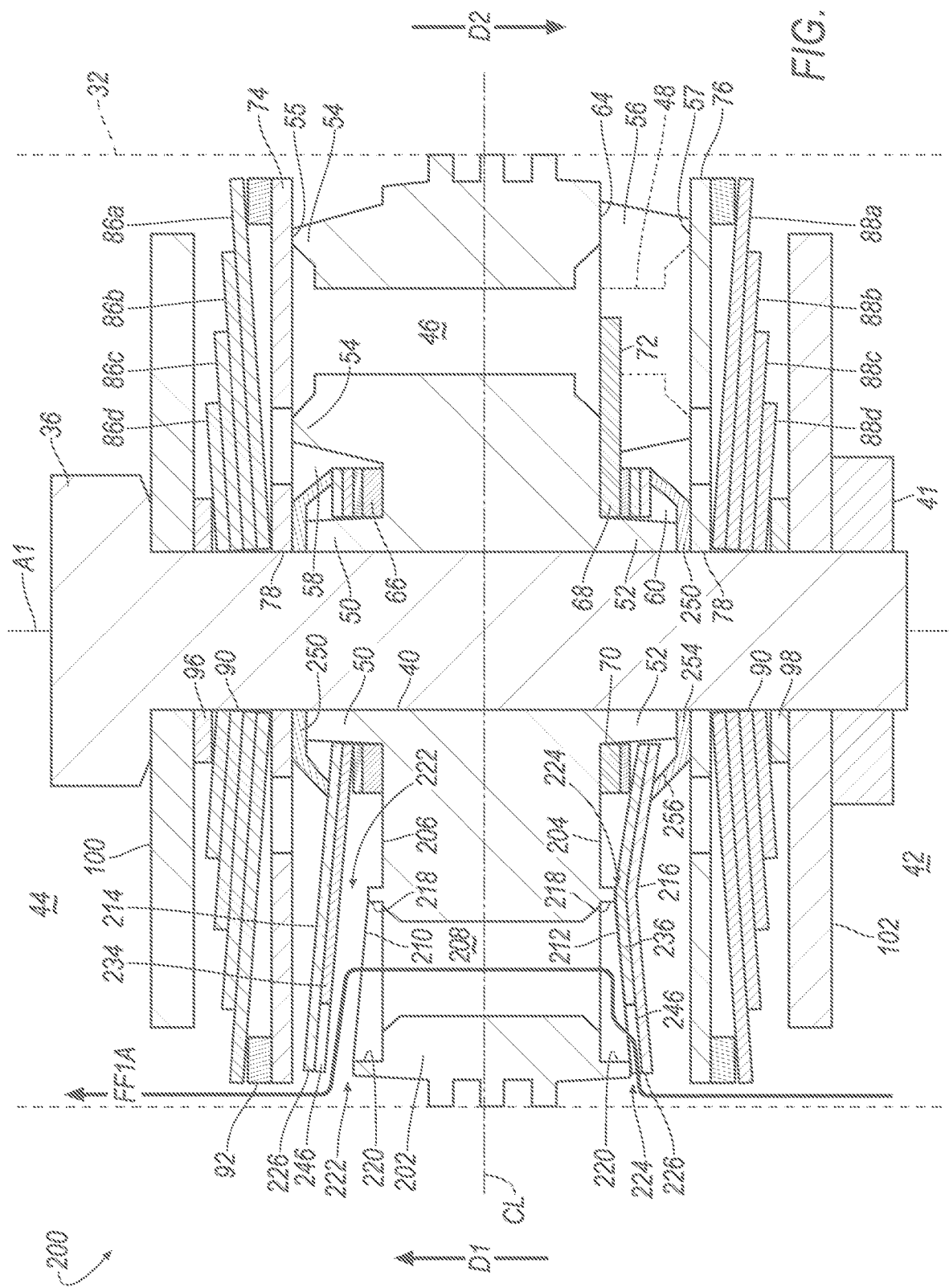
FIG. 10 is the cross section of FIG. 4 and illustrating the first fluid flow path when the damper assembly of FIGS. 3A-4 is moved toward the compressed position with the fluid flow rate and/or pressure differential above a first threshold.
Figure 11:
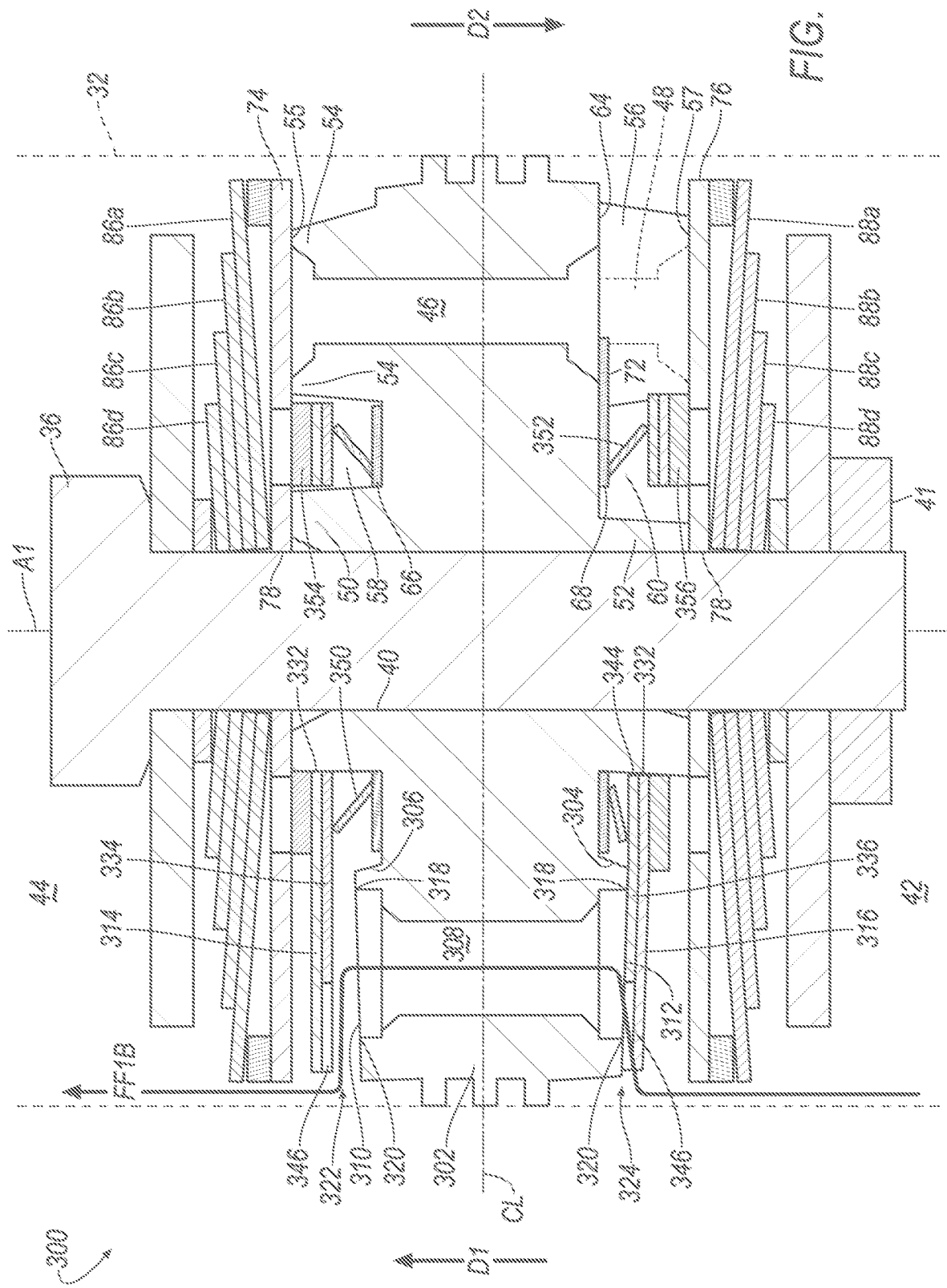
FIG. 11 is the cross section of FIG. 6 and illustrating the first fluid flow path when the damper assembly of FIGS. 5A-6 is moved toward the compressed position with the fluid flow rate and/or pressure differential above a first threshold.

With reference to FIGS. 10 and 11, the respective damper assembly 200, 300 is illustrated as moved toward the compressed position when the fluid flow rate and/or the pressure differential between the rebound sub-chamber 44 and the compression sub-chamber 42 is greater than the first threshold. The first threshold may be such that a magnitude of the curve C1 reaches a predetermined amount of response force within a predetermined amount of time. The predetermined amounts may be based on empirical testing, e.g., to optimize vehicle performance and/or occupant comfort.

When the fluid flow rate and/or the pressure differential are greater than the first threshold, the fluid flow along the first fluid flow path FF1A, FF1B moves the respective second check disc 216, 316 towards the respective piston 202, 302. Moving the second check disc 216, 316 toward the piston 202, 302 decreases the size of the opening 224, 324 therebetween.

For example, the second orifice disc 236 illustrated in FIG. 10 may be moved into abutment with the piston 202 at the inner edges 218 the first passages 208 and with the second check disc 214, 314 abutting the second orifice disc 236 opposite the piston 202, thereby minimizing the size of the opening 224, e.g., to be generally equal to the radial flow area of the orifices 246 of the second orifice disc 236.

As another example, the second orifice disc 336 illustrated in FIG. 11 may be moved into abutment with the piston 302 at the outer edges 320 of the first passages 308 and with the second check disc 316 abutting the second orifice disc 336 opposite the piston 302, thereby minimizing the size of the opening 324, e.g., to be generally equal to the radial flow area of the orifices 346 of the second orifice disc 336.

Figure 12:
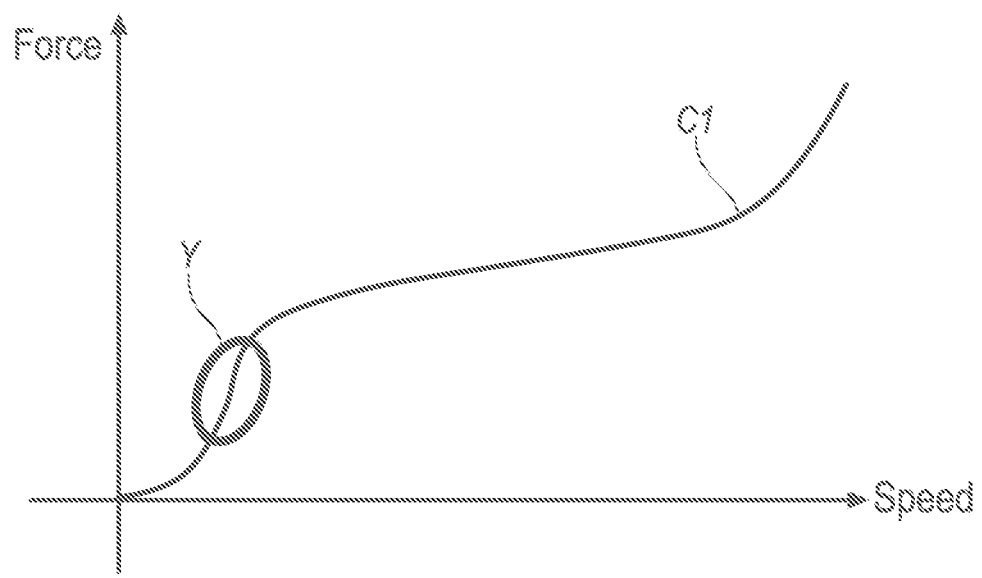
FIG. 12 is an illustration of the force response curve of the damper assembly moving toward the compressed position, the illustration identifying a second portion of the curve.

Decreasing and/or minimizing the size of the openings 224, 324 decreases the defined area of the respective first fluid flow path FF1A, FF1B, and increases resistance to movement of the respective damper assembly 200, 300 by reducing the rate at which fluid may flow from the compression sub-chamber 42 to the rebound sub-chamber 44. Such resistance is illustrated in FIG. 12 by a section Y of the curve C1.

Figure 13:
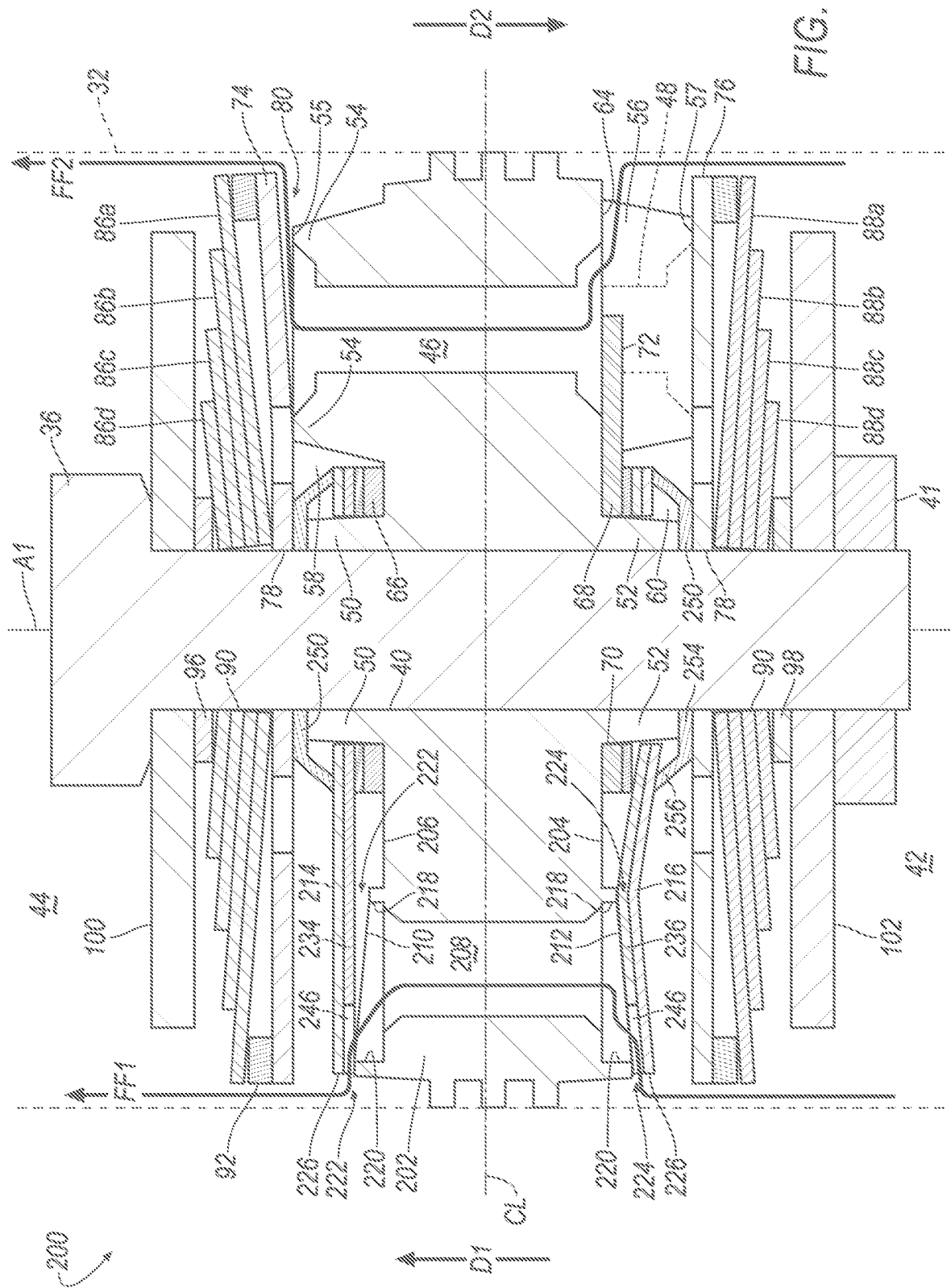
FIG. 13 is the cross section of FIG. 4 and illustrating the first fluid flow path and a second fluid flow path when the damper assembly of FIGS. 3A-4 is moved toward the compressed position with the fluid flow rate and/or pressure differential above a second threshold.
Figure 14:
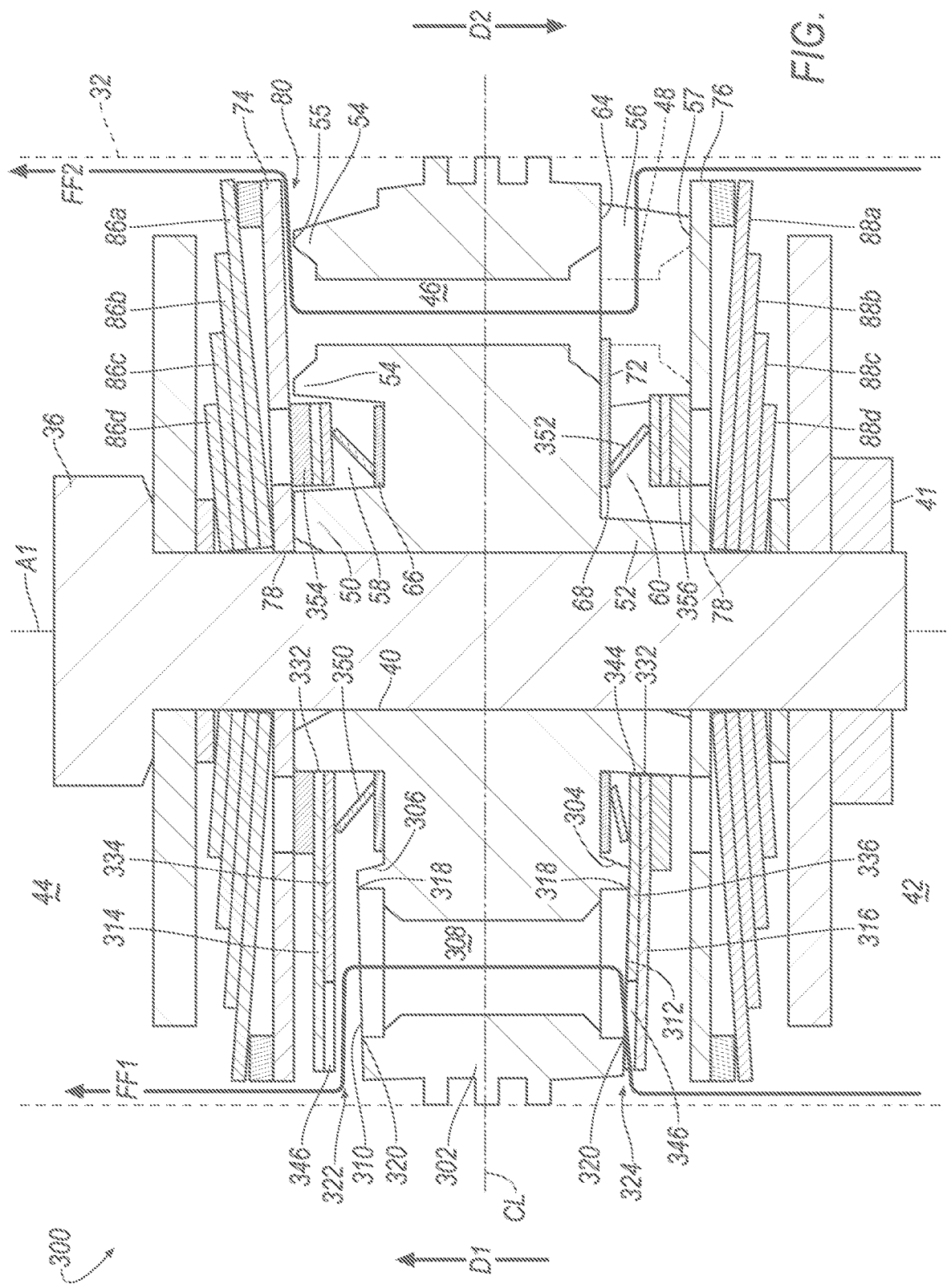
FIG. 14 is the cross section of FIG. 6 and illustrating the first fluid flow path and a second fluid flow path when the damper assembly of FIGS. 5A-6 is moved toward the compressed position with the fluid flow rate and/or pressure differential above a second threshold.

With reference to FIGS. 13 and 14, a second fluid flow path FF2 defined by each damper assembly 200, 300 is illustrated. The second fluid flow path FF2 is defined when the respective damper assembly 200, 300 is moved toward the compressed position and the fluid flow rate and/or the pressure differential between the compression sub-chamber 42 and the rebound sub-chamber 44 is greater than a second threshold. The second threshold may be greater than the first threshold such that a slope and/or magnitude of the curve C1 does not exceed a predetermined amount. The predetermined amount may be based on empirical testing, e.g., to optimize vehicle performance and/or occupant comfort.

When the fluid flow rate and/or pressure differential is above the second threshold the first blow off disc 74 and the first spring discs 86a-86e are urged away from the respective piston 202, 302 and the opening 80 therebetween is created. The second fluid flow path FF2 extends from the compression sub-chamber 42 to the rebound sub-chamber 44 via the second passages 46 and the opening 80 between the piston 202, 302 and the first blow off disc 74. The second fluid flow path FF2 defines an area through which fluid may flow. The defined area of the second fluid flow path FF2 may include multiple sub-areas.

Figure 15:
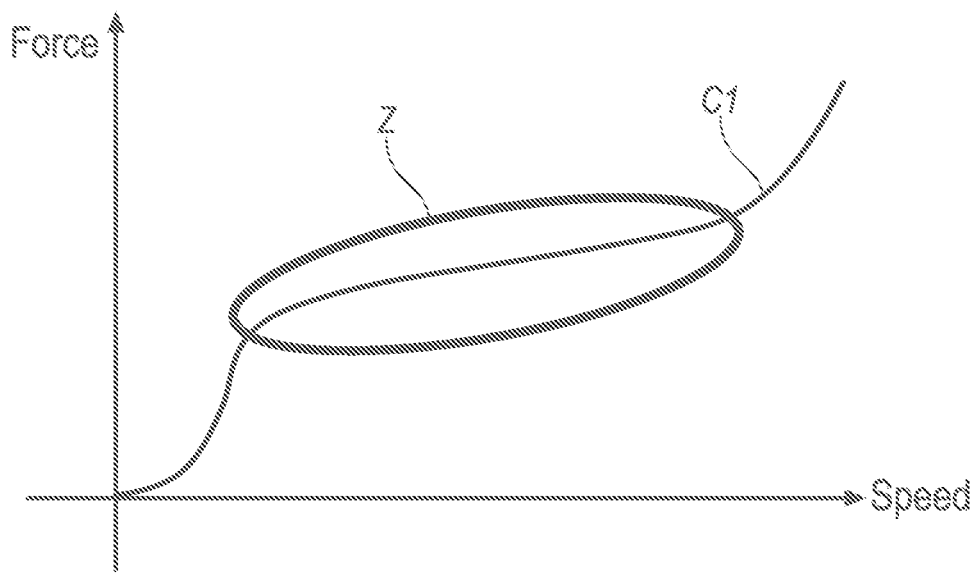
FIG. 15 is an illustration of a force response curve of the damper assembly moving toward the compressed position, the illustration identifying a third portion of the curve.

The combined defined areas of the first fluid flow path FF1A, FF1B and the second fluid flow path FF2 reduce resistance to movement of the respective damper assembly 200, 300 (relative to the defined area of just the first fluid flow path FF1A, FF1B) by increasing a rate at which fluid may flow from the compression sub-chamber 42 to the rebound sub-chamber 44. Such resistance is illustrated in FIG. 15 by a section Z of the curve C1.

With reference to FIGS. 16 17, 21 and 24 a third fluid flow path FF3A, FF3B and a fourth fluid flow path FF4 defined by the respective damper assemblies 200, 300 are illustrated. The third and fourth fluid flow paths FF3A, FF3B FF4, may be defined when the respective damper assembly 200, 300 is moved toward the extended position and the fluid flow rate and/or the pressure differential between the compression sub-chamber 42 and the rebound sub-chamber 44 is above the second threshold.

Figure 16:
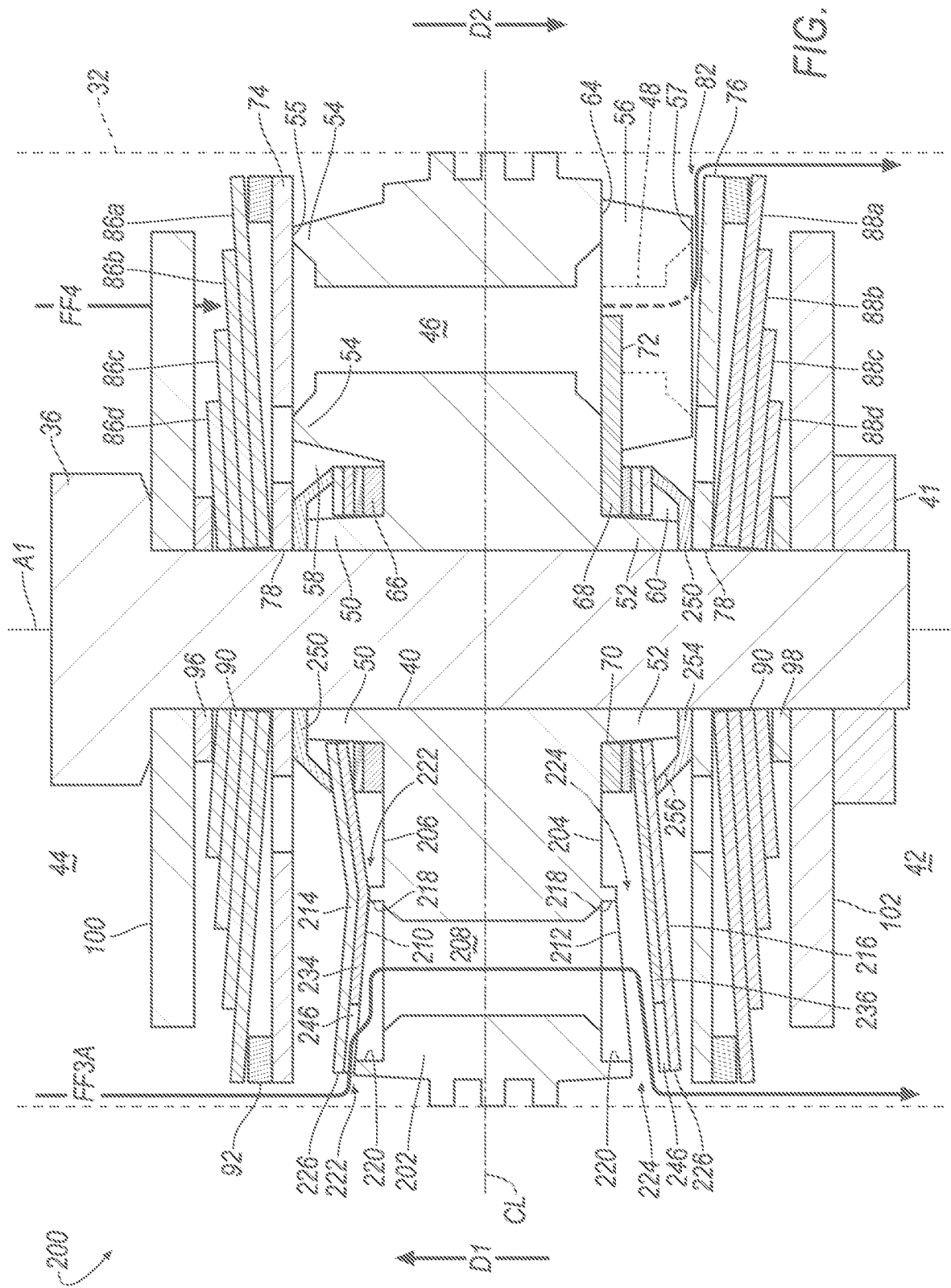
FIG. 16 is the cross section of FIG. 4 and illustrating a third fluid flow path and a fourth fluid flow path when the damper assembly of FIGS. 3A-4 is moved toward an extended position with a fluid flow rate and/or pressure differential above a second threshold.

The third fluid flow path FF3A illustrated in FIG. 16 extends from the rebound sub-chamber 44 to the compression sub-chamber 42 via the first passages 208 and the openings 222 between the first check disc 214 and the piston 202.

Figure 17:
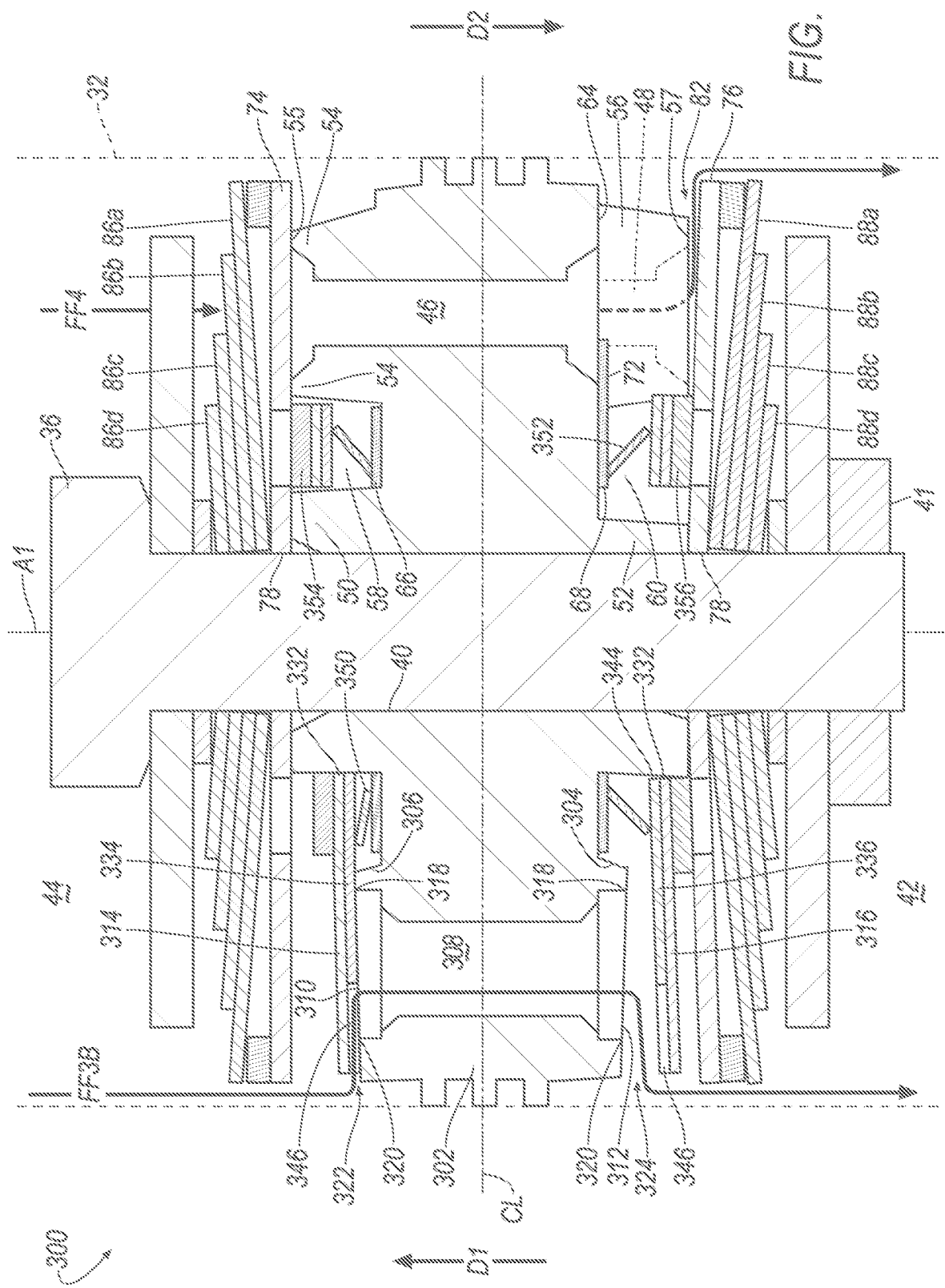
FIG. 17 is the cross section of FIG. 6 and illustrating a third fluid flow path and a fourth fluid flow path when the damper assembly of FIGS. 5A-6 is moved toward the extended position with the fluid flow rate and/or pressure differential above a second threshold.
Figure 21:
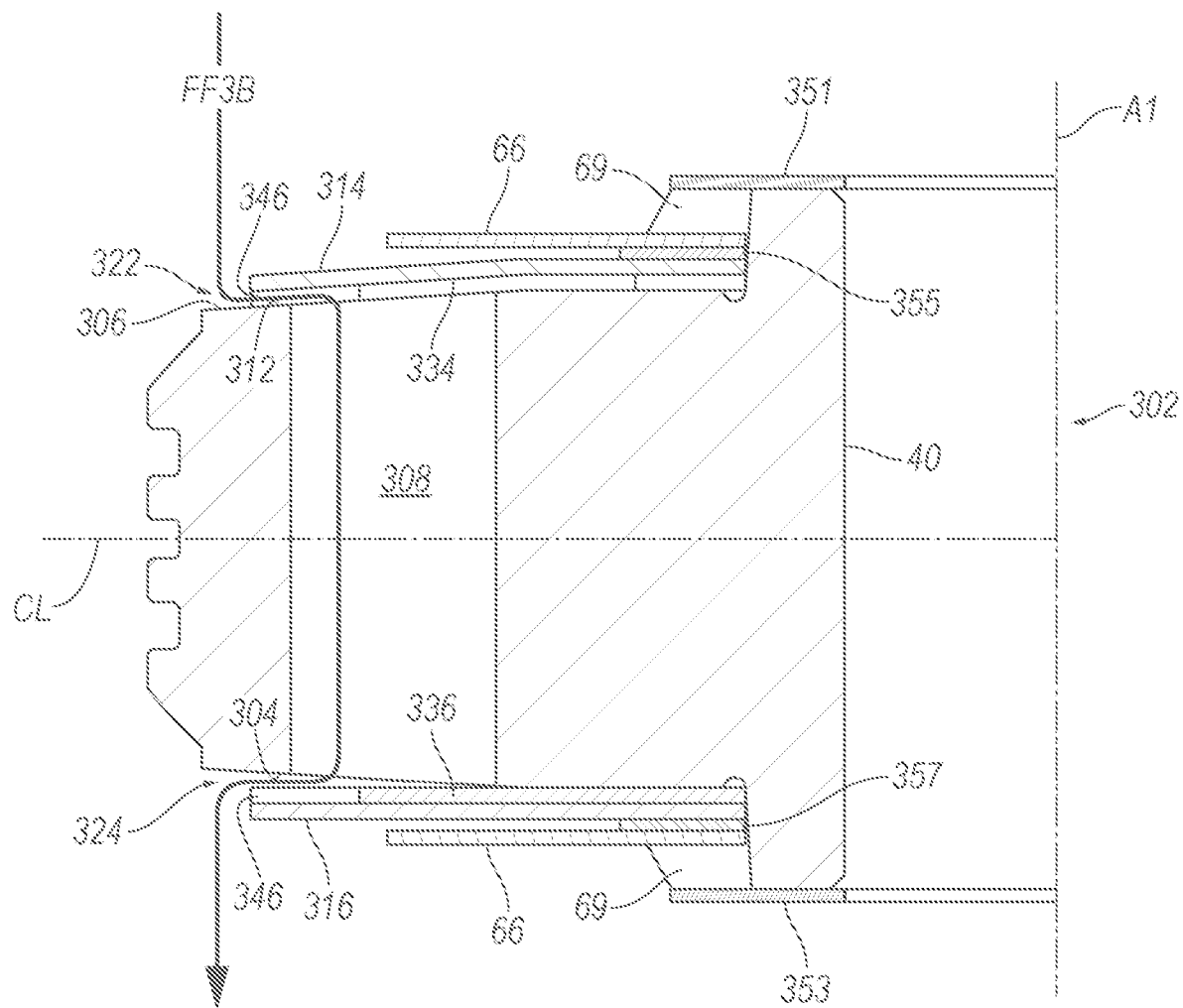
FIG. 21 is a cross section of the components of FIG. 19 illustrating the third fluid flow path.
Figure 24:
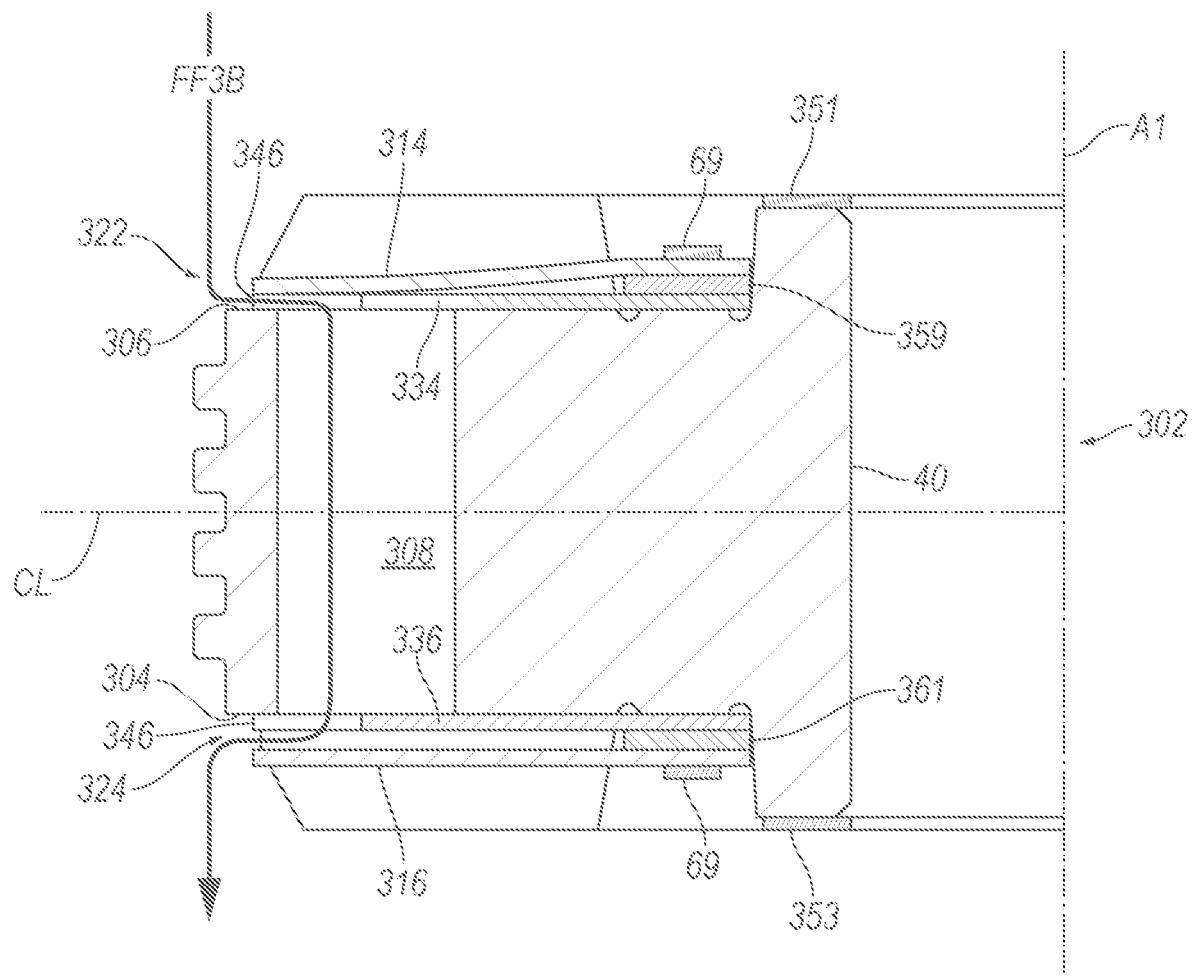
FIG. 24 is a cross section of the components of FIG. 22 illustrating the third fluid flow path.

The third fluid flow path FF3B illustrated in FIGS. 17, 21, and 24 extends from the rebound sub-chamber 44 to the compression sub-chamber 42 via the first passages 308 and the openings 322 between the first check disc 314 and the piston 302.

Returning to FIG. 17, the fourth fluid flow path FF4 extends from the rebound sub-chamber 44 to the compression sub-chamber 42 via the third passages 48 and the opening 82 between the second blow off disc 76 and the piston 202, 302.

Figure 18:
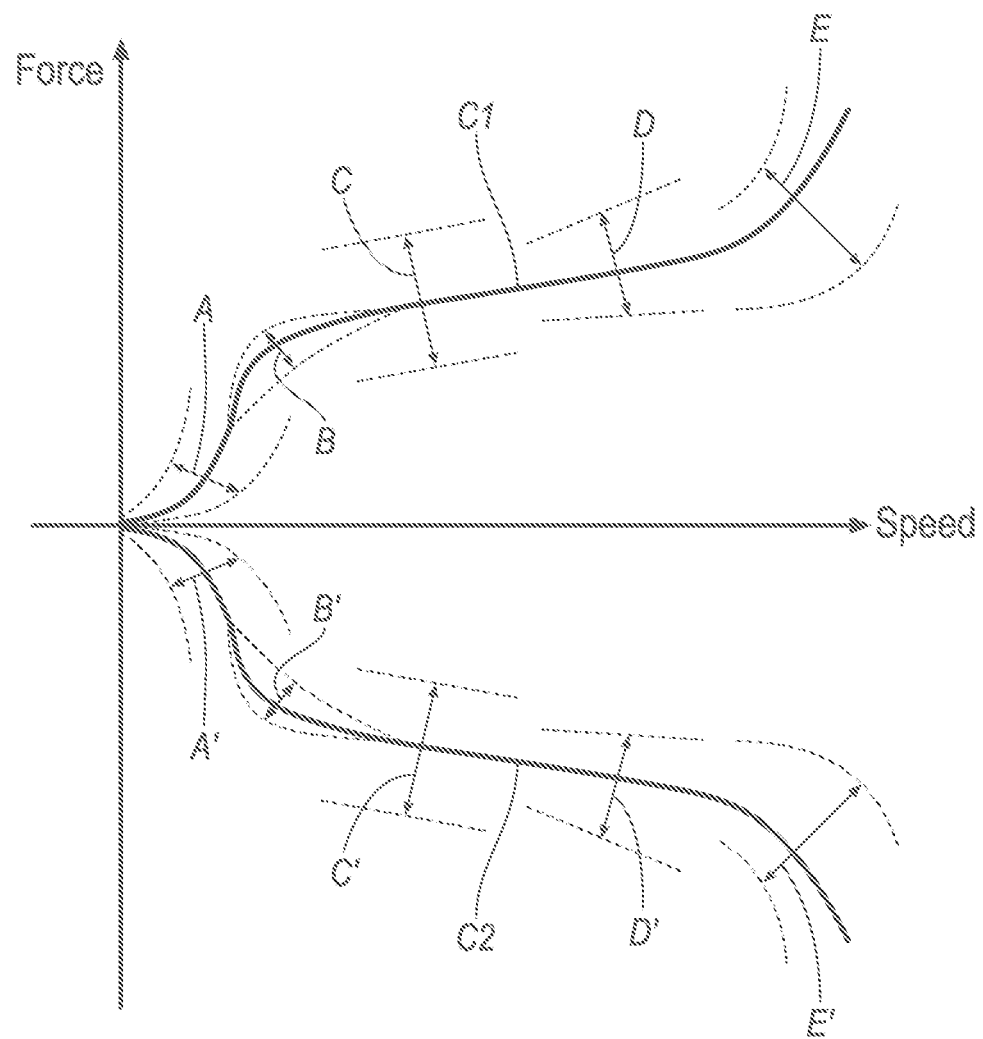
FIG. 18 is an illustration of the force response curve of the damper assembly moving toward the compressed position and a force response curve of the damper assembly moving toward the compressed position.

With reference to FIG. 18, the curve C1 and the curve C2 are shown. The curve C1 indicates response force provided by the damper assembly 200, 300 moving toward the compressed position at increased speeds. The curve C2 indicates response force provided by the damper assembly 200, 300 moving toward the extended position at increased speeds. The various components of the damper assembly 200, 300 may be configured to control the curves C1, C2, i.e., to control an amount of responsive force provided by the damper assembly 200, 300 at various speeds.

The curves C1, C2 may be increased or decreased in slope and/or in magnitude proximate arrows A and A', e.g., providing tuning for low speed movement of the damper assembly 200, 300. For example, increasing a steepness of the slope 210, 310, increasing a stiffness of the check disc 214, 314, and/or increasing a size of the orifice 246, 346 of the orifice disc 234, 334 may decrease the slope and/or magnitude of the curve C1 proximate arrow A. Similarly increasing a steepness of the slope 212, 312, increasing a stiffness of the check disc 216, 316, and/or increasing a size of the orifice 246, 346 of the orifice disc 236, 336 may decrease the slope and/or magnitude of the curve C2 proximate arrow A'. As another example, decreasing a steepness of the slope 210, 310, decreasing a stiffness of the check disc 214, 314, and/or decreasing a size of the orifice 246, 346 of the orifice disc 234, 334 may increase the slope and/or magnitude of the curve C1 proximate arrow A. Similarly decreasing a steepness of the slope 212, 312, decreasing a stiffness of the check disc 216, 316, and/or decreasing a size of the orifice 246, 346 of the orifice disc 236, 336 may increase the slope and/or magnitude of the curve C2 proximate arrow A'.

The curves C1, C2 may be increased or decreased in slope and/or in magnitude proximate arrows B and B'. For example, asymmetrically increasing a stiffness of the first blow off disc 74 may increase the slope and/or magnitude of the curve C1 proximate arrow B. Similarly, asymmetrically increasing a stiffness of the second blow off disc 76 may increase the slope and/or magnitude of the curve C2 proximate arrow B'. As another example, asymmetrically decreasing the stiffness of the first blow off disc 74 may decrease the slope and/or magnitude of the curve C1 proximate arrow B. Similarly, asymmetrically decreasing stiffness of the second blow off disc 76 may decrease the slope and/or magnitude of the curve C2 proximate arrow B'.

The curves C1, C2 may be increased or decreased in slope and/or in magnitude proximate arrows C and C', e.g., providing tuning for mid speed movement of the damper assembly 20. For example, decreasing a thickness of the rings 92, 94 may decrease the slope and/or magnitude of the curve C1 proximate arrow C and arrow C'. As another example, increasing the thickness of the rings 92, 94 may increase the slope and/or magnitude of the curve C1 proximate arrow C and arrow C'.

The curves C1, C2 may be increased or decreased in slope and/or in magnitude proximate arrows D and D'. For example, increasing a stiffness of the first spring discs 86a-86d may increase the slope and/or magnitude of the curve C1 proximate arrow D. Similarly, increasing a stiffness of the second spring discs 88a-88d may increase the slope and/or magnitude of the curve C2 proximate arrow D'. As another example, decreasing the stiffness of the first spring discs 86a-86d may decrease the slope and/or magnitude of the curve C1 proximate arrow D. Similarly, decreasing the thickness of the second spring discs 88a-88d may decrease the slope and/or magnitude of the curve C2 proximate arrow D'.

The curves C1, C2 may be increased or decreased in slope and/or in magnitude proximate arrows E and E', e.g. to control high speed response. For example, increasing a size of the extensions 72 of the first restriction disc 66 may increase the slope and/or magnitude of the curve C1 proximate arrow E. Similarly, increasing a size of the extensions 72 of the second restriction disc 68 may increase the slope and/or magnitude of the curve C2 proximate arrow E'. As another example, decreasing the size of the extensions 72 of the first restriction disc 66 may decrease the slope and/or magnitude of the curve C1 proximate arrow E. Similarly, decreasing the size of the extensions 72 of the second restriction disc 68 may decrease the slope and/or magnitude of the curve C2 proximate arrow E'.

Although the curves C1, C2 proximate the various arrows A, A', B, B', C, C', D, D', E, E' are described individually, the curves C1, C2 may be controlled based on a cumulative effect of the configuration of the various components. For example, configuring the damper assembly 20 to control the curves C1, C2 proximate arrows A, A', may also change the curves C1, C2, proximate the other arrows B, B', C, C', D, D', E, E'.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A damper assembly, comprising:
   a cylinder defining a chamber;
   a body supported by the cylinder and having a first surface and a second surface opposite the first surface, the body defining a passage in fluid communication with the chamber and extending from the first surface to the second surface, the first surface defining a slope at the passage; and a check disc at the slope, the check disc movable from an unflexed position spaced from the first surface at the slope toward the body to a flexed position on the first surface at the slope to selectively restrict fluid flow through the passage.

2. The damper assembly of claim 1, further comprising an orifice disc between the check disc and the body movable from a second unflexed position toward the body to a second flexed position.

3. The damper assembly of claim 2, wherein the orifice disc abuts the body and the check disc.

4. The damper assembly of claim 2, wherein the orifice disc defines an orifice between the check disc and the body, the orifice open in a radial direction.

5. The damper assembly of claim 1, wherein the slope is convex relative to the body.

6. The damper assembly of claim 1, wherein the check disc in the unflexed position is spaced from the first surface at an outer edge of the passage and in the flexed position is on the first surface at the outer edge of the passage.

7. The damper assembly of claim 1, wherein the slope is concave relative to the body.

8. The damper assembly of claim 1, wherein the check disc is in the unflexed position is spaced from the first surface at an inner edge of the passage and in the flexed position is on the first surface at the inner edge of the passage.

9. The damper assembly of claim 1, wherein the check disc selectively restricts fluid flow in a first direction, and further comprising a second check disc selectively restricting fluid flow through the passage in a second direction opposite first direction the second check disc movable from a second unflexed position toward the body to a second flexed position.

10. The damper assembly of claim 1, wherein the body defines a second passage extending from the first surface to the second surface, and further comprising a blow off disc flexible away from the body to selectively permit fluid flow out of the second passage.

11. The damper assembly of claim 10, wherein the check disc is between the body and the blow off disc.

12. The damper assembly of claim 10, wherein the blow off disc defines an opening and a center opening.

13. The damper assembly of claim 12, further comprising a spacer disc abutting the blow off disc and covering the opening of the blow off disc.

14. The damper assembly of claim 10, further comprising a restriction disc abutting the body and covering a portion of the second passage.

15. The damper assembly of claim 10, further comprising a spring disc urging the blow off disc toward the body.

16. The damper assembly of claim 15, further comprising a ring between the spring disc and the blow off disc, and a restriction disc abutting the body and covering a portion of the second passage.

17. The damper assembly of claim 10, further comprising a plurality of spring discs urging the blow off disc toward the body, the springs discs progressively decreasing in size.

18. The damper assembly of claim 1, further comprising a spring urging the check disc toward the body.

19. The damper assembly of claim 18, wherein the spring includes a base and a plurality of arms extending circumferentially and axially from the base.

20. The damper assembly of claim 1, wherein the body is a piston.

* * * * *